United States Patent
Kunz Arrache et al.

(10) Patent No.: US 12,251,993 B2
(45) Date of Patent: Mar. 18, 2025

(54) AUTOMOTIVE DOOR AND WINDOW SYSTEMS, DEVICES, AND METHODS

(71) Applicant: Via Fortuna, LLC, Wilmington, DE (US)

(72) Inventors: Pablo Kunz Arrache, Vänersborg (SE); Jean Pierre Pinsonneault, Antibe (FR); Jason Castriota, Stamford, CT (US)

(73) Assignee: Via Fortuna, LLC, Wilmington, DE (US)

( * ) Notice: Subject to any disclaimer, the term of this patent is extended or adjusted under 35 U.S.C. 154(b) by 0 days.

(21) Appl. No.: 18/758,397

(22) Filed: Jun. 28, 2024

(65) Prior Publication Data
US 2025/0001849 A1    Jan. 2, 2025

Related U.S. Application Data

(60) Provisional application No. 63/524,238, filed on Jun. 30, 2023.

(51) Int. Cl.
*B60J 10/40* (2016.01)
*B60J 5/04* (2006.01)
(Continued)

(52) U.S. Cl.
CPC ............ *B60J 10/40* (2016.02); *B60J 5/0479* (2013.01); *B60J 10/87* (2016.02); *E05F 15/695* (2015.01); *E05Y 2900/531* (2013.01)

(58) Field of Classification Search
None
See application file for complete search history.

(56) References Cited

U.S. PATENT DOCUMENTS

| | | |
|---|---|---|
| 3,866,524 A | 2/1975 | Forbes, Jr. |
| 4,771,575 A | 9/1988 | Tiesler |

(Continued)

FOREIGN PATENT DOCUMENTS

| | | |
|---|---|---|
| DE | 102019213427 A1 | 3/2021 |
| EP | 479522 B1 | 11/1995 |

(Continued)

OTHER PUBLICATIONS

Toyoda Gosei Develops Glass Run with New Structure for Improved Automobile Design Characteristics and Quietness; Toyoda Gosei; Oct. 19, 2017; https://www.toyoda-gosei.com/news/details.php?id=164.

(Continued)

*Primary Examiner* — Joseph D. Pape
(74) *Attorney, Agent, or Firm* — Troutman Pepper Hamilton Sanders LLP; Christopher C. Close, Jr.; Aaron E. Johnston

(57) ABSTRACT

Disclosed embodiments may include a vehicle without a B-pillar that has barn doors and partially frameless windows. The barn doors may include a window seal system having a primary seal for creating a watertight barrier when the window is in a first closed position. Upon the vehicle exceeding a predetermined speed threshold, the vehicle may automatically raise the window from the first closed position to being in a second closed position in which a secondary seal secures the window to prevent buffeting of the window. Disclosed embodiments may further include a seal and door structure that provides a pair of seals (an inner seal and an outer seal) between the front and rear barn doors that provide a watertight barrier when the doors are closed together and that also allows for each of the front and rear doors to be independently opened and closed in a barn-door fashion.

12 Claims, 18 Drawing Sheets

(51) Int. Cl.
  *B60J 10/86* (2016.01)
  *E05F 15/695* (2015.01)

(56) References Cited

U.S. PATENT DOCUMENTS

| | | | |
|---|---|---|---|
| 4,993,775 A | 2/1991 | Keys | |
| 6,030,022 A | 2/2000 | Bormann et al. | |
| 6,612,074 B1 | 9/2003 | Kaye et al. | |
| 7,934,342 B2 | 5/2011 | Lahnala | |
| 8,091,948 B2 | 1/2012 | Smith et al. | |
| 8,196,992 B2 * | 6/2012 | Konchan | B60J 10/40 49/475.1 |
| 8,246,101 B2 | 8/2012 | Cicala | |
| 8,328,268 B2 * | 12/2012 | Charnesky | B60J 10/86 292/DIG. 3 |
| 8,555,552 B2 * | 10/2013 | Hooton | B60J 10/244 49/477.1 |
| 8,572,898 B2 | 11/2013 | Grudzinski et al. | |
| 8,650,802 B2 | 2/2014 | Grudzinski et al. | |
| 8,793,938 B2 | 8/2014 | Grudzinski et al. | |
| 9,487,065 B2 | 11/2016 | Bender | |
| 10,427,511 B2 | 10/2019 | Blottiau | |
| 11,639,086 B2 | 5/2023 | Blottiau et al. | |
| 11,712,953 B2 | 8/2023 | Nolte | |
| 11,807,080 B2 * | 11/2023 | Gabbianelli | B60J 5/0479 |
| 11,987,103 B2 | 5/2024 | Yuksel et al. | |
| 2003/0110703 A1 | 6/2003 | Kobrehel | |
| 2005/0279027 A1 | 12/2005 | Tsuchida et al. | |
| 2009/0038229 A1 | 2/2009 | Cicala et al. | |
| 2012/0159858 A1 | 6/2012 | Mori et al. | |
| 2012/0234621 A1 | 9/2012 | Syvret et al. | |
| 2016/0167488 A1 | 6/2016 | Snider | |
| 2017/0368923 A1 | 12/2017 | Kuwabara et al. | |
| 2018/0009301 A1 | 1/2018 | Kobayashi et al. | |
| 2018/0079283 A1 | 3/2018 | Farhadi et al. | |
| 2018/0141421 A1 | 5/2018 | Blottiau | |
| 2021/0122220 A1 | 4/2021 | Ogawa | |
| 2021/0170840 A1 | 6/2021 | Whitton | |
| 2022/0305993 A1 | 9/2022 | Scott-Collins et al. | |

FOREIGN PATENT DOCUMENTS

| | | | |
|---|---|---|---|
| EP | 1477355 B1 | | 10/2010 |
| EP | 1407909 B1 | | 6/2012 |
| EP | 3183131 A1 | | 6/2017 |
| EP | 3183132 A1 | | 6/2017 |
| EP | 3102448 B1 | | 1/2019 |
| EP | 3004501 B1 | | 7/2022 |
| JP | 2000280744 | * | 10/2000 |
| JP | 2005255108 A | | 9/2005 |
| JP | 2016048017 A | | 4/2016 |
| JP | 2017-210164 | * | 11/2017 |
| WO | 2010080895 A1 | | 7/2010 |
| WO | 2014082312 A1 | | 6/2014 |
| WO | 2017055577 A1 | | 4/2017 |
| WO | 2023003877 A1 | | 1/2023 |

OTHER PUBLICATIONS

Suicide door; Wikipedia;I https://en.wikipedia.org/wiki/Suicide_door.

Pumilia, Alessandro. A door opening system: from case studies to the design of a hinge system for small series vehicles. A Master's degree thesis at Politecnico di Torino, 2020. (Year: 2020).

Dikmen, E., and I. Basdogan. an abstract of "Material characteristics of a vehicle door seal and its effect on vehicle vibrations." Vehicle System Dynamics 46.11 (2008): 975-990. (Year: 2008).

Mozzone, Maurizio. "Study of the Door Closing Performance of an Aluminum Door." (2013). (Year: 2013).

Mithila Achintha—Sustainability of glass in construction, The University of Manchester (Dec. 2016) (Year: 2016).

International Search Report dated Dec. 3, 2024 issued in International Application No. PCT/US2024/036055.

Fleming, William J. "New automotive sensors—A review." IEEE Sensors Journal 8.11 (2008): 1900-1921. (Year: 2008).

* cited by examiner

AUTOMOTIVE DOOR AND WINDOW SYSTEMS, DEVICES, AND METHODS

CROSS-REFERENCE TO RELATED APPLICATION

This application claims, under 35 U.S.C. § 119 (e), the benefit of U.S. Provisional Application No. 63/524,238, filed Jun. 30, 2023, the entire contents and substance of which is hereby incorporated by reference.

FIELD OF THE INVENTION

The disclosed technology relates to automotive door and window systems, devices, and methods. Specifically, this disclosed technology relates to automotive window and door technologies that enable flush or substantially-flush sealing between the window glass, the trim of the door, and the roof of the vehicle. Additionally, these technologies allow for the use of 'barn-style' vehicle doors that open from the middle of the vehicle and toward the front and rear of the vehicle, but allow each door (e.g., the front door or the rear door) to be opened independently of the other door.

BACKGROUND

Historical use of automotive doors that open from common point (e.g., having a front hinged front door and a rear hinged rear door) have been plagued with engineering difficulties. Likewise, attempts to create windows on automobiles that have glass that is flush with body panels and trim pieces has been similarly troublesome. Additionally, attempts to create frameless or partially frameless windows has been met with comparable challenges.

Accordingly, there is a need for improved systems and methods for automotive door and window systems. Embodiments of the present disclosure are directed to this and other considerations.

SUMMARY

Disclosed embodiments may include a vehicle without a B-pillar that has barn doors and partially frameless windows. The barn doors may include a window seal system having a primary seal for creating a watertight barrier when the window is in a first closed position. Upon the vehicle exceeding a predetermined speed threshold, the vehicle may automatically raise a window from the first closed position to being in a second closed position in which a secondary seal secures the window to prevent buffeting of the window. Disclosed embodiments may further include a seal and door structure that provides a pair of seals (an inner seal and an outer seal) between the front and rear barn doors that provide a watertight barrier when the doors are closed together and that also allows for each of the front and rear doors to be independently opened and closed in a barn-door fashion.

Disclosed embodiments may include a system including a vehicle door and a vehicle body. The vehicle door having a door body including a framing portion and a window configured to be vertically repositioned to open and close the window. The window has a frameless portion and a framed portion. The framed portion of the window corresponds to the framing portion of the door body. The vehicle body includes a primary seal configured to compress against an internal face of the framed portion and frameless portion of the window to create a watertight seal when the window is in a first closed position and a second closed position. The vehicle body further includes a secondary seal configured to secure at least the frameless portion of the window in place when the window is in the second closed position.

Disclosed embodiments may include a system including a vehicle door including a window, a vehicle body including a recess for receiving a portion of the window, one or more processors and a memory in communication with the one or more processors and storing instructions that, when executed by the one or more processors, are configured to cause the system to automatically cause the window to move from a first closed position to a second closed position in response to determining that the vehicle body has exceeded a predetermined speed threshold. The recess of the vehicle body may include a first seal and a second seal.

Disclosed embodiments may include a method that includes receiving vehicle input data of a vehicle that includes at least vehicle speed. The method may include determining whether the vehicle speed is greater than a predetermined value. The method may further include transmitting instructions to one or more window motors to cause the one or more window motors to raise a window position of a window from a first closed position to a second closed position in response to determining the vehicle speed is greater than the predetermined value.

Disclosed embodiments may include a vehicle including a front door and a rear door. The front door may include a first seal and a second seal. The front door may be hinged at the front of the vehicle. The rear door may include first sealing surface configured to receive the first seal and a second sealing surface configured to receive the second seal. The rear door may be hinged at the rear of the vehicle. The front door and the rear door may be capable of independently opening and closing.

Disclosed embodiments may include a vehicle body having a first side that does not have a B-pillar. The first side includes a front door that rotates on one or more front hinges and a rear door that rotates on one or more rear hinges such that the front door and rear door close together in a barn-door fashion.

Disclosed embodiments may include a vehicle body without a B-pillar that has a front door and a rear door configured to close together in a barn-door fashion. The front door and rear door are configured to open and close independently of one another.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
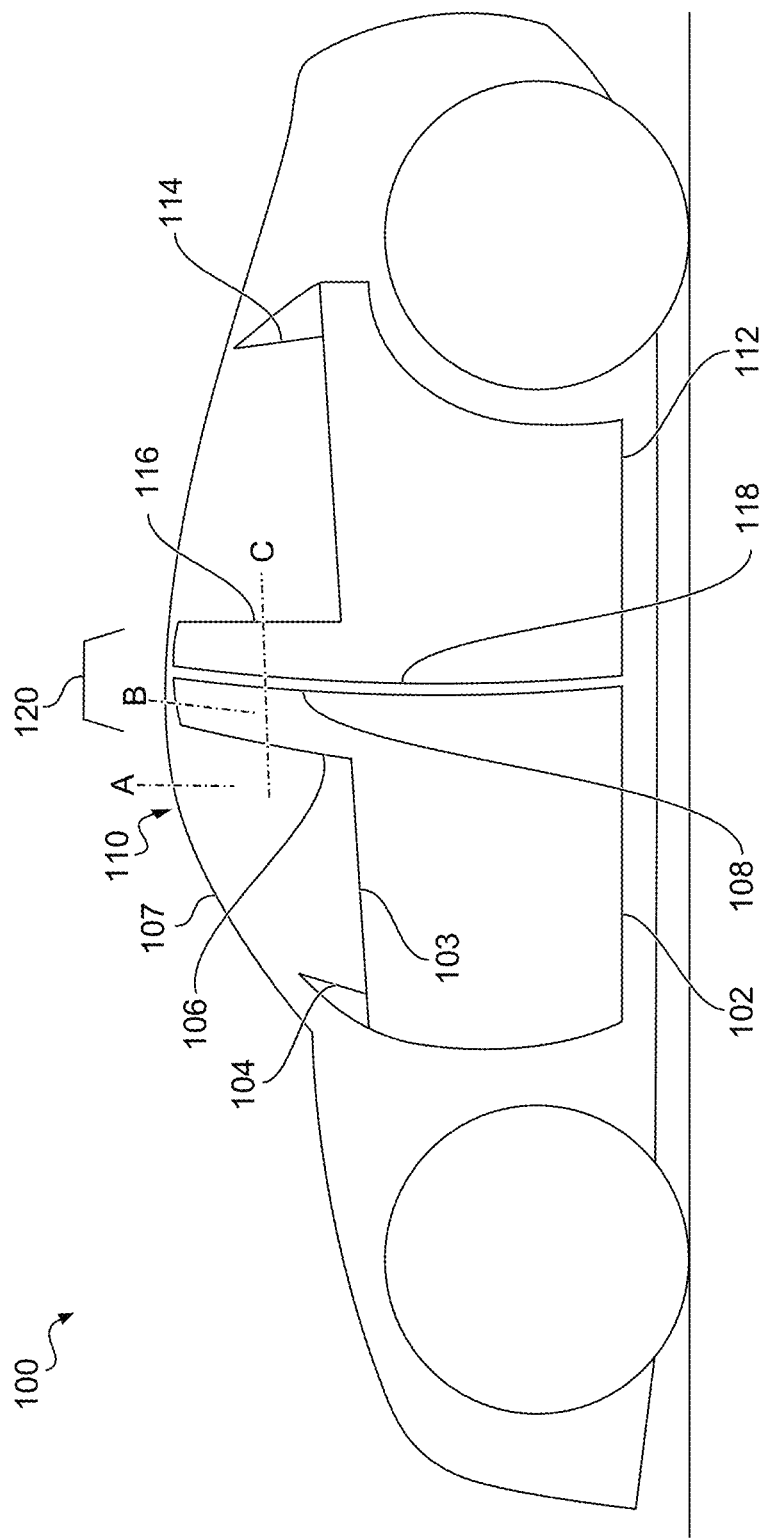
FIG. 1 is an illustration of a vehicle with side barn doors, an integrated b-pillar structure, and partially frameless windows in accordance with certain embodiments of the disclosed technology.

FIG. 1 is an illustration of a vehicle 100 (automobile) with a front door 102 and a rear door 112 that may collectively be referred to as side barn doors or barn-style doors. According to some embodiments, the front door 102 is attached to the vehicle body 110 by one or more hinges at a front portion of the front door 102 and the rear door 112 is attached to the vehicle body 110 by one or more hinges at a rear portion of the rear door 112 such that the front door 102 and rear door 112 may open from the middle of the vehicle 100. Such a manner of opening may be referred to as opening in a barn door fashion. In other words, when opening, the front door 102 may open by swinging outwards from the vehicle body 110 in a direction that is towards the front of the vehicle 100, whereas the rear door 112 may open by swinging outwards from the vehicle body 110 in a direction that is towards the rear of the vehicle 100. The front door 102 and rear door 112 are positioned parallel to the direction of travel of the vehicle 100 when the front door 102 and rear door 112 are in a closed position. As described below, the vehicle 100 may have an integrated B-pillar structure (which may be referred to as a "quasi-B-pillar" 120) formed when the front door 102 and rear door 112 are closed together and may include partially frameless windows in accordance with certain embodiments of the disclosed technology.

The vehicle 100 may have a B-pillarless design. In other words, the vehicle 100 may lack a conventional B-pillar that is formed as a static part of the vehicle body 110. The vehicle 100 may be constructed using a door ring technology, where the body parts surrounding the side barn doors (i.e., front and rear doors 102, 112) are assembled as a complete unit, as described, for example, in U.S. patent application Ser. No. 18/661,058, filed May 10, 2024, titled "Modular Motor Vehicle Platforms and Assembly Methods," the entire contents of which is expressly incorporated by reference herein. The door ring may house front door 102 and the rear door 112 such that the bodies of each door are substantially positioned within the space defined by the door ring when the doors are closed. The vehicle 100 may be assembled using cast technology, as described, for example, in U.S. patent application Ser. No. 18/661,096, filed May 10, 2024, titled "Modular Motor Vehicle Platforms and Assembly Methods," the entire contents of which is expressly incorporated by reference herein. The barn doors 102, 112 may interlock with the door ring or body 110 of the vehicle 100 at the top of the vehicle 100 and/or at the bottom of the vehicle 100 to effectively simulate or approximate a B-pillar design when the doors 102, 112 are shut.

Each of the front door 102 and rear door 112 may be opened using by a user engaging a door handle (not shown) and pulling the door open. In some embodiments, the vehicle body 110 may include one or more latch strikers that engage with one or more latching mechanisms of the front door 102 and/or rear door 112 to secure the door(s) in a closed position. Thus, in some embodiments, a user may open the front door 102 and/or rear door 112 by disengaging the one or more latches used to secure the door(s) shut, by, for example engaging a door handle mechanism of the door, which may cause the door to become unlatched. According to some embodiments, the vehicle body 110 may include one or more upper latch strikers (e.g., upper door latch strikers 302, 304 shown in FIG. 3) that are positioned at an upper portion of the vehicle body 110 (e.g., at, near or extending downwards from a roof of the vehicle body 110) and that are positioned to engage with and latch an upper portion of a door and one or more lower latch strikers (e.g., lower door latch strikers 312, 314 shown in FIG. 3) that are positioned at a lower portion of the vehicle body 110 (e.g., at, near or extending upwards from a floor of the vehicle body 110) and that are positioned to engage with and latch a lower portion of a door. In some embodiments, the vehicle body 110 may include a first upper latch striker and a first lower latch striker that are positioned to latch the front door 102 at an upper and lower portion of the front door 102 respectively, and a second upper latch striker and a second lower latch striker that are positioned to latch the rear door 112 at an upper and lower portion of the rear door 112, respectively. As will be understood by those of ordinary skill in the art, one or more latches may be used in a vehicle to tightly secure a door in a closed position. In some embodiments, a latch may be released/unlatched in response to an activation of a door handle mechanism or other door opening mechanism (e.g., an automatic door opening mechanism).

The windows on the side barn doors 102, 112 may be completely frameless, partially frameless (as shown in FIG. 1), or framed. The windows may be designed such that the glass is flush or substantially flush with the body 110 of the vehicle at the roof, the door ring, and/or the trim pieces of the door. The flush or substantially flush glass aspects may provide significant aerodynamic advantages over other vehicles that do not contain flush or substantially flush glass as the air encounters fewer restrictions as it is traveling over the vehicle. This can manifest as better gas mileage in fossil-fuel powered designs and better range in electric vehicles.

Additionally, current automotive partial frameless window designs require the window to quickly drop down prior to the user opening or closing the car door. This is because when the window is in the up/closed position, it is held to the vehicle body underneath a piece of clamping trim or a "clip." These clips or trim pieces are required to keep the window from vibrating or buffeting at high speeds. If the system fails to drop the window adequately before the user opens or closes the door (e.g., when the vehicle is unpowered), the window can be held back by the clip as the door is opened or contact the clip while the door is closed. This can cause the window to break or damage to the retaining trim piece. Additionally, users may find the window movements when opening and closing the doors to be annoying, as it creates noise. The present design, as shown in FIG. 1, eliminates these shortcomings by using an innovative seal design and raising the window above a threshold closed level when the vehicle exceeds a threshold speed. The present design may reduce an airgap between the windows and doors, which may provide other advantages such as increased efficiency/aerodynamics of the vehicle and noise reduction. Furthermore, the present design, as shown in FIG. 1, allows both the front and rear barn doors 102, 112 to be opened independently (i.e., the front door 102 does not have to be opened prior to opening the rear door 112 or vice versa).

According to some embodiments, a body of the front door 102 may include a first framing portion 104 that frames a front edge of a front window 103 and a second framing portion 106 that frames a rear edge of the front window 103. The front window 103 may considered to be a partially framed window. In other words, the front window 103 may have a framed portion that is made of up of the edges of the front window 103 that are framed by the first framing portion 104 and the second framing portion 106 and the front window 103 may also have a frameless portion 107 that is the top edge of the front window 103, as the body of the front door 102 is frameless at the top.

The front window 103 may be retractably housed within a body of the front door 102 such that a vertical position of the front window 103 may be adjusted to move the front window 103 from being in an open position as shown in FIG. 1 (e.g., the window being retracted into the body of the front door 102 completely) to being in a partially open position, to being in a first or second closed position (i.e., providing a watertight barrier from the outside environment). As will be described in greater detail below, in some embodiments, the vehicle body 110 may include a window seal system configured to secure the front window 103 and/or rear window closed in a first vertical position and, for example, upon the vehicle exceeding a predetermined speed, may also be configured to automatically reposition the front window 103 (and/or similarly a rear window in the rear door 112) upwards into a second closed position. According to some embodiments, the window seal system may be designed to prevent the window from buffeting at high speed when in the second closed position. Although this disclosure generally refers to a front and rear window of one side of the vehicle, it will be appreciated that it is contemplated that disclosed technology may be implemented on both the driver's side and passenger's side of a vehicle. Furthermore, it is contemplated that the window seal system may possibly be used in conjunction with additional doors on vehicles, such as for example, additional doors that may exist buses, limousines, or other such extended vehicles.

The front door 102 may further include a rear edge 108 that extends from a bottom portion of the vehicle 100 to a top portion of the vehicle 100 (e.g., from the floor to the roof of the vehicle 100). As will be explained in greater detail below, the rear edge 108 may include one or more seals and/or surfaces designed to create a watertight seal between the front door 102 and the rear door 112 when the front door 102 and rear 112 are both closed together. Further, as shown in FIG. 1, a portion of the body of the front door 102 that occupies the vertical space between the second framing portion 106 of the front door 102 and the rear edge 108 of the front door 102 provides a contiguous vertical structure that when paired with a corresponding structure of the rear door 112 may form a quasi-B-pillar 120 that provides structural support for the vehicle 100.

Similar to the front door 103, the rear door 112 may also include a first framing portion 114 and a second framing portion 116 that provide for a partially framed window. A rear window housed in the body of the rear door 112 may be configured to operate in a manner similar to that described above with respect to the front window 103. Further, the rear door 112 may include a front edge 118 that may also include one or more seal receiving surfaces designed to interact with one or more seals positioned on the rear edge 108 of the front door 102 to provide a watertight seal between the front door 102 and rear door 112 when the front door 102 and rear door 112 are in a closed position, as described in greater detail below. Providing one or more seals between the front door 102 and rear door 112 in this manner may reduce an airgap between the doors, which may provide other advantages such as increased efficiency/aerodynamics of the vehicle and noise reduction. Further, as mentioned above, when the front door 102 and rear door 112 are both secured (e.g., via latches) in a closed position such that the rear edge 108 of the front door 102 is adjacent to the front edge 118 of the rear door 112, a first frame structure of the front door 102 that is made up of the vertical portion of the door body between the second framing portion 106 and the rear edge 108 of the front door 102 may join with a second frame structure of the rear door 112 that is made up of the vertical portion of the door body between the second framing portion 116 and the front edge 118 of the rear door 112 to form a quasi-B-pillar 120 that provides structural support for the vehicle 100. In other words, although the vehicle 100 may be without a typical B-pillar that provides structural support for the vehicle, embodiments of the present disclosure may nevertheless provide such structural support through the quasi-B-pillar 120 that is formed by combining portions of the structure of the front door 102 and rear door 112 when the doors are securely closed together. For example, each of the front door 102 and rear door 112 may include one or more structural members (e.g., first, second and third structural members 1035, 1037, 1038 shown in FIG. 10A) that can provide structural support to the vehicle 100 by transferring loads from the doors 102, 112 of the vehicle 112 via the latches and/or other mating surfaces. Thus, when the doors 102, 112 are secured closed (e.g., via one or more latches), the combined internal structures of the front door 102 and rear door 112 may collectively form a quasi-B-pillar 120.

Figure 2A:
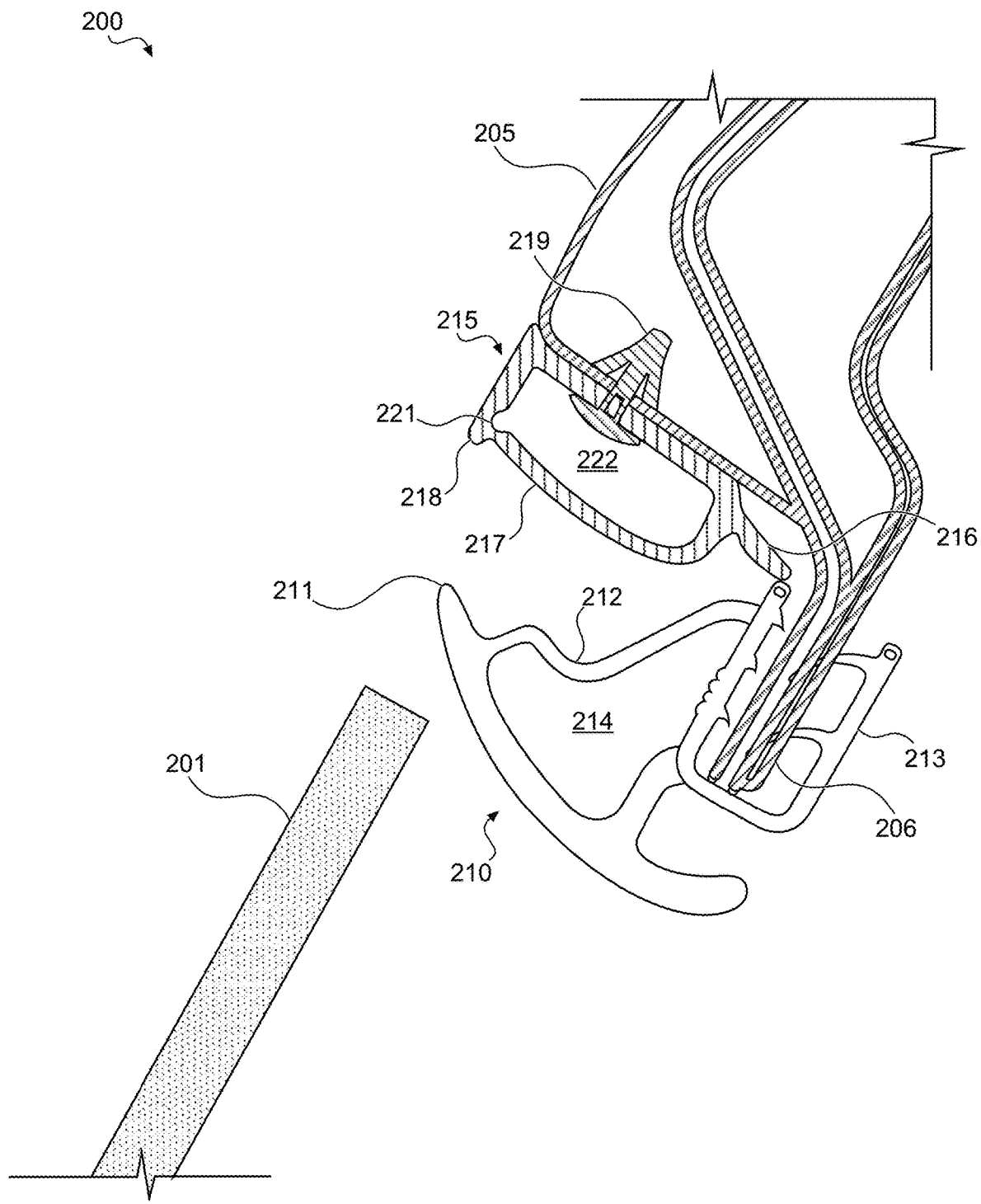
FIG. 2A is an illustration of a seal and substantially flush glass windows design for partially frameless windows on an automobile at cross-section A where the window is in an open closed position, in accordance with certain embodiments of the disclosed technology.

FIG. 2A illustrates the window seal system 200 of an automotive window at cross-section A when the window 201 is in an open or partially open position (i.e., when the window is fully or partially "rolled down"). The window seal system 200 may include a primary seal 210 for providing a watertight seal against the outside environment when the window 201 is in a closed position. Window 201 may be made of glass, tempered glass, laminated glass, plexiglass or another material used for automotive windows. The window may be flush or substantially flush with vehicle body 205 (e.g., vehicle body 110 of FIG. 1), which may be the roof of the vehicle. The vehicle body 205 may include a lip 206, flange or other attachment structure, which may be used to attach the primary seal 210 to the vehicle body. The lip 206 may be positioned along one or more portions of the vehicle body 205 that align with the frameless portion(s) of the window(s) (e.g., frameless portion 107 of front window 103 of front door 102 and/or corresponding frameless portion of a rear window of rear door 112 shown in FIG. 1) when the vehicle door(s) are closed. Further, in some embodiments, with the exception of the transitional area described below with respect to FIG. 2D, the lip 206 may extend around the entire door ring of the vehicle to allow the primary seal 210 to extend around the entirety of the door ring.

Figure 2B:
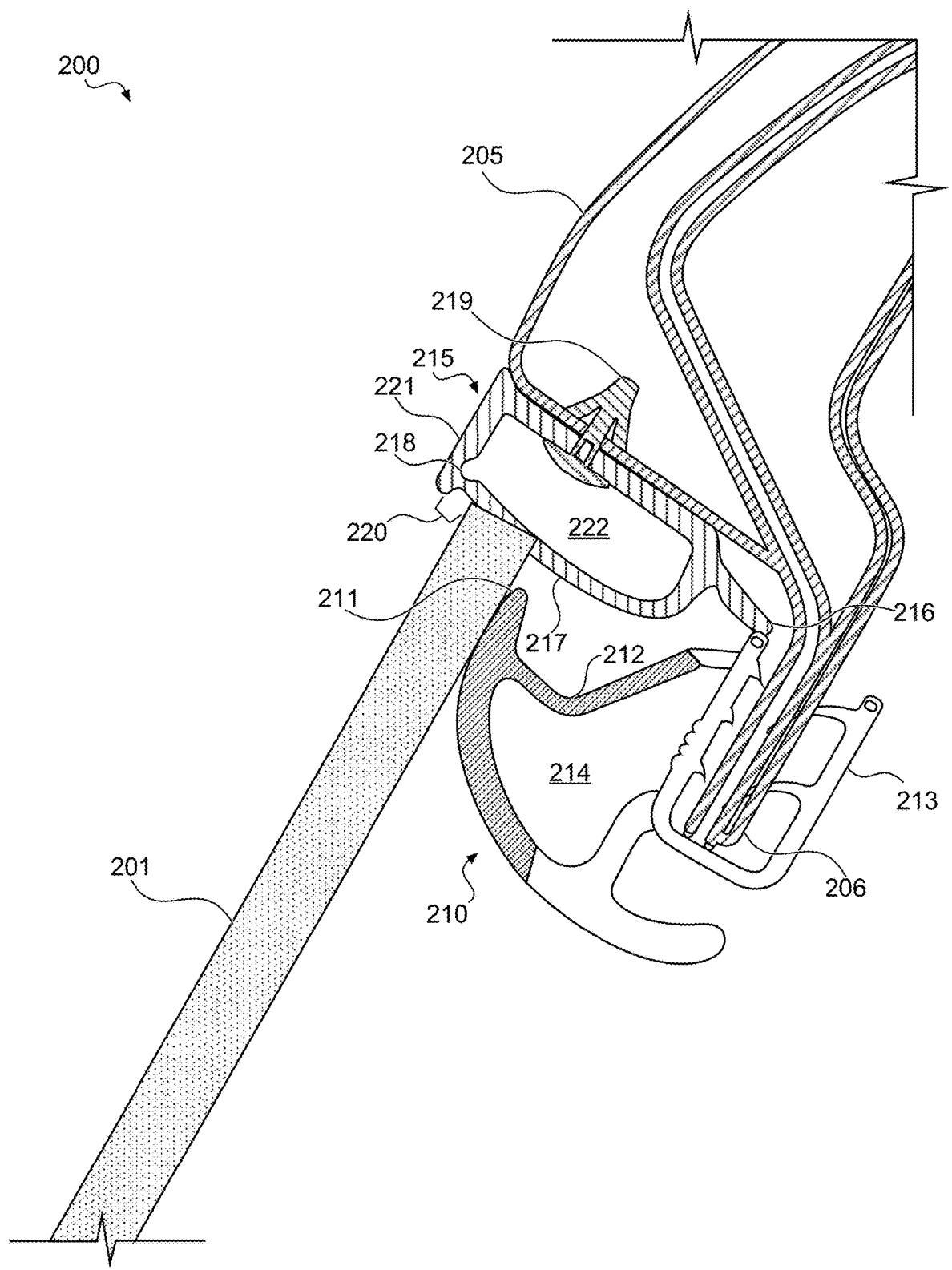
FIG. 2B is an illustration of a seal and substantially flush glass windows design for partially frameless windows on an automobile at cross-section A where the window is in a first closed position, in accordance with certain embodiments of the disclosed technology.

The primary seal 210 may be made from rubber or a similar material. The primary seal 210 is configured to compress against an internal face of the window 201 to create a watertight seal when the window 201 is closed. The primary seal 210 may include a U-shape portion 213 that secures the primary seal 210 to the lip 206 of the vehicle body 205. The primary seal 210 may contain one or more cavities or compartments 214. The compartment 214 may be a hollow portion of the primary seal 210 containing air. The air may flow in and out of the compartment via one or more apertures in the walls of the primary seal 210 to allow for compression of the primary seal 210. The one or more compartments 214 may be in the shape of a delta (Δ) or may be in the shape of a number eight (8), or other shape. For example, as shown in FIG. 2A, the primary seal 210 may have a compartment 214 that is modified delta shape formed in part by an S-shape portion 212 of the primary seal 210. The S-shape portion 212 of the primary seal 210 may provide the primary seal 210 with additional force and stability when engaged with the window 201. For example, such additional force and stability may be provided by a convex bend of the S-shape portion 212 of the primary seal 210 that collapses into a concave position when the window moves from being an open position to being in a closed position, as shown by the change in shape of the S-shape portion 212 of the primary seal 210 between FIG. 2A and FIG. 2B. The primary seal 210 may include a tip 211 for engaging with the window 201 when the window 201 is in a closed position. As shown in FIG. 2A, in some embodiments, the tip 211 of the primary seal 210 may be angled slightly upwards such that when being put into a closed position, the window 201 may cause the tip 211 of the primary seal 210 to bend further upwards/inwards while compressing against the window 201. The one or more compartments 214 of the primary seal 210 may allow the primary seal 210 to compress inwards towards the body 205 of the vehicle when the window 201 is in a closed position (as shown in FIG. 2B) and the window 201 is exerting an inward force against the primary seal 210. Further, when the window 201 is subsequently placed into an open position, the one or more compartments may cause the primary seal 210 to return to its original shape, such that the tip 211 of the primary seal 210 returns to a lower position as shown in FIG. 2A.

Window seal system 200 may include a secondary seal 215. The secondary seal 215 may be made from rubber or other similar material. In some embodiments, secondary seal 215 may include a finger 216, a pillow 217 and/or a lip 218. The pillow 217 may be a compressible and/or deformable structure that includes a compartment 222. In some embodiments, as shown in FIG. 2A, the pillow 217 may have a roughly rectangular cross-sectional shape. The structure of the secondary seal 215 may include an indentation 221 positioned behind the lip 218 on an internal wall of the pillow 217, which may cause the secondary seal 215 to more securely grip the surface of the window 201 when the window 201 is placed in a second closed position as described further below. The indentation 221 may be a portion of the outer wall (i.e., the wall that is disposed towards the outer environment of the vehicle) of the secondary seal 215 where the thickness of the outer wall is less than the thickness of the rest of the outer wall. The indentation 221 may allow this portion of the pillow 217 to more easily bend inwards when force is applied to the lower wall of the pillow 217 (i.e., the wall that is disposed towards the upper edge of the window 201) by the window 201. The compartment 222 may be a hollow portion of the secondary seal 215 that may contain air. The air may flow in and out of the compartment via one or more apertures in the walls of the secondary seal 215 to allow for compression of the secondary seal 215. Secondary seal 215 may also include or be attached to a retaining shape 219 (e.g., clip) in order to attach the secondary seal 215 to the vehicle body 205. For example, the retaining shape 219 may extend through a through-hole of the vehicle body 205 and anchor or otherwise secure the secondary seal 215 to the vehicle body 205 as shown in FIG. 2A. The vehicle body 205 may include a plurality of such through-holes across the length of the vehicle body 205 (e.g., the roof) and the secondary seal 215 may include a plurality of retaining shapes 219 for securing the secondary seal 215 to the vehicle body 205 at each through-hole. The retaining shape 219 may be of integral construction with the secondary seal 215. The finger 216 of secondary seal 215 may be optional. The finger 216 of secondary seal 215 may be used for water management. For example, in some embodiments, the finger 216 of the secondary seal 215 may contact a rear portion of the primary seal 210 as shown in FIG. 2A to create a channel between the primary seal 210 and the secondary seal 215 for receiving any water that manages to pass by the secondary seal 215 when the window is closed to prevent water from leaking into the internal compartment of the vehicle. The channel may be configured to direct fluid externally from the vehicle. For example, water in the channel may be distributed or released into the external environment (e.g., by gravity pulling the water to the side or bottom of the vehicle via the channel, where one or more apertures may be present to release the water external to the vehicle). The finger 216 may also provide an aesthetic functionality by obstructing the view of sheet metal of the internal structure of the vehicle behind the secondary seal 215 and the primary seal 210 so that, for example, when a user is positioned outside the vehicle looking in, the user may only see one continuous color in this area (e.g., the black of the primary seal 210 and secondary seal 215). According to some embodiments, the finger 216 at cross section A may be connected to the primary seal 210 in a manner similar to that shown in FIG. 2D.

According to some embodiments, some or all of the primary seal 210 and/or secondary seal 215 may be positioned within a recess of the vehicle body 110 that is configured to receive a portion of a window (i.e., an upper portion of a window). In other words, according to some embodiments, some or all of the primary seal 210 and secondary seal 215 may be positioned at a location that is in an inboard direction relative to an outer surface of the vehicle body 110. In some embodiments, an outboard surface of the secondary seal 215 may be flush or substantially flush with the outer surface of the vehicle body 110.

According to some embodiments, the primary seal 210 and secondary seal 215 may be of integral construction with each other. In words, in some embodiments, the primary seal 210 and secondary seal 215 may be made of a one piece of material. Thus, in some embodiments, the primary seal 210 and secondary seal 215 may be integrated into vehicle 100 as a single piece. In some embodiments, the primary seal 210 and secondary seal 215 may be integrated into vehicle 100 as separate pieces. According to some embodiments, the primary seal 210 may completely extend around the door ring. In some embodiments, the secondary seal 215 may completely extend around the door ring. In some embodiments, the primary seal 210 and/or secondary seal 215 may extend around one or more portions of the door ring including portions adjacent to the roof of the vehicle, the hinged edges of the doors and the lower edge of the vehicle body (e.g., proximate the bottom of the doors).

Figure 2C:
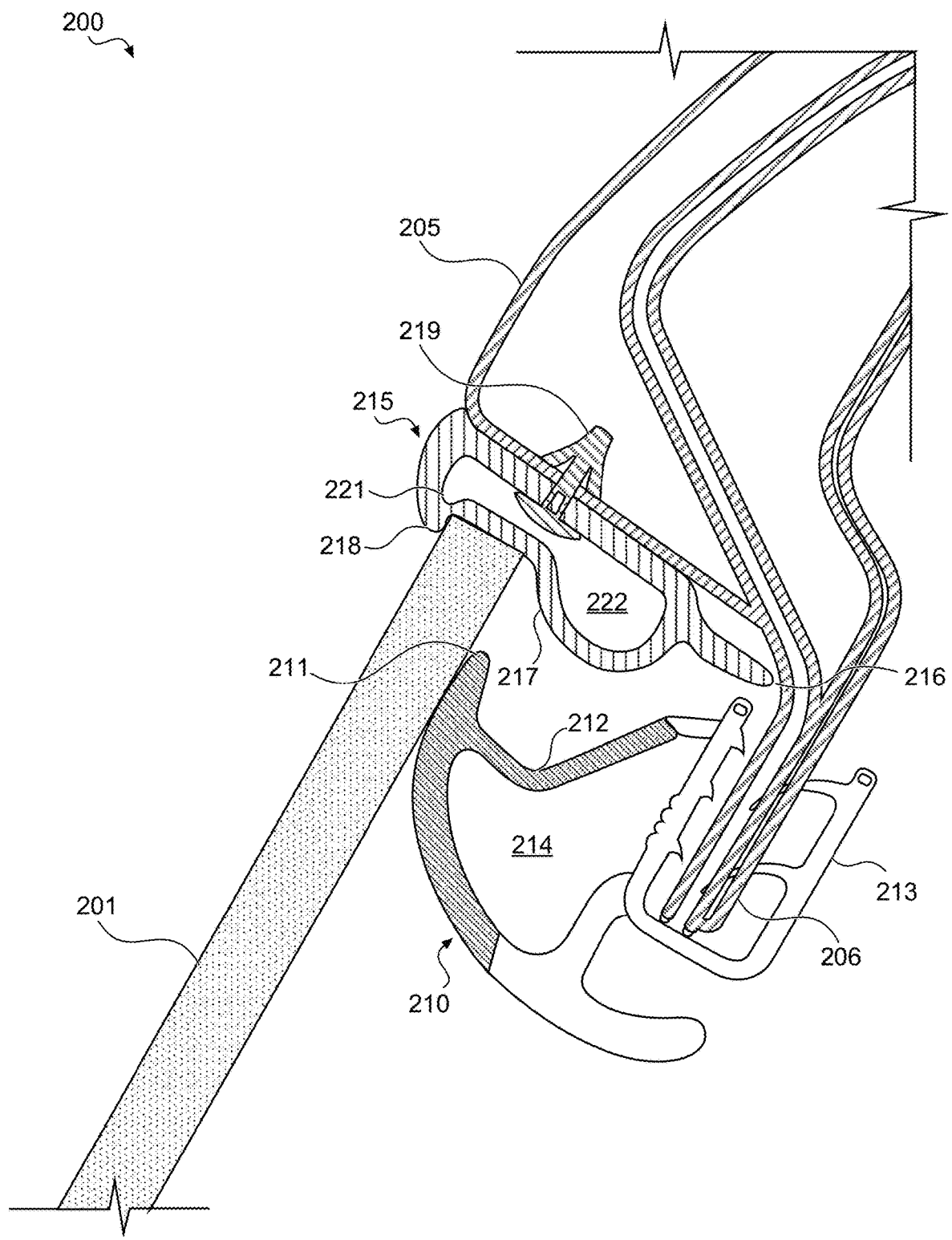
FIG. 2C is an illustration of a seal and substantially flush glass windows design for partially frameless windows on an automobile at cross-section A where the window is in a second closed position, in accordance with certain embodiments of the disclosed technology.

FIG. 2B illustrates a window seal system 200 of an automotive window at cross-section A with a window 201 being in a first closed position, in accordance with certain embodiments of the disclosed technology. As shown in FIG. 2B, when closed, the inner surface of window 201 may press against primary seal 210 forming a barrier against liquids and the environment. Primary seal 210 may prevent water or rain from entering the vehicle when the window is closed, while also positioning window 201 laterally to be flush or substantially flush with vehicle body 205. According to some embodiments, the outer surface of the window 205 may be offset from the plane of the outer surface of the vehicle body 205 (i.e., the roof) and/or the outer surface of the primary seal 210 by approximately 3.5 mm, which may be considered to be "substantially flush," whereas typical vehicles normally have an offset of 6-7 mm. As shown, when the door is closed, a tip 211 of the primary seal 210 may be positioned to compress against the inner surface of the window 201 to create the watertight barrier between the internal compartment of the vehicle and the outside environment. The window seal system 200 described herein may be utilized in association with both of the front door 102 and rear door 112 and may be incorporated into both the driver's side and the passenger's side of the vehicle 100. Further, when the window 201 is placed in the first closed position as shown in FIG. 2B, a top edge of the window 201 may contact a lower surface of the secondary seal 215. In some embodiments, there may be a slight gap between the top edge of the window 201 and the lower surface of the secondary seal 215 when the window is in the first closed position. According to some embodiments, the lip 218 of the secondary seal 215 may be positioned slightly externally to the outer surface of the window 201 when the window 201 is in the first closed position, creating a gap or step 220 between the lip 218 of the secondary seal 215 and the window 201. As shown in FIG. 2C, this step 220 may be eliminated when the window 201 is placed into the second closed position and the lip 218 of the secondary seal 218 hugs the outer surface of the window 201. According to some embodiments, when the secondary seal 218 compresses around the top surface of the 201 it may cause the top surface of the window to move inboard laterally by some distance, such as for example between 2-3 mm. In this case, the exterior surface of the window 201 would no longer be flush or substantially flush with the vehicle body 205 (i.e., the roof), however because a portion of the secondary seal 215 will occupy the space external to the window 201, the window 201 and secondary seal 215 may collectively remain flush or substantially flush with the vehicle body 205.

When stationary or at low speeds, the window 201 may be in a first closed position as shown in FIG. 2B. When the speed of the vehicle exceeds a certain amount (dictated by aerodynamics of the vehicle), air may have a tendency to travel behind the glass of the window and cause buffeting. To avoid this, window 201 may be raised from the first closed position shown in FIG. 2B into a second position as shown by FIG. 2C when the speed exceeds a threshold amount. FIG. 2C illustrates the window seal system 200 of an automotive window at cross-section A of FIG. 1 with the window 201 being in a second closed position, in accordance with certain embodiments of the disclosed technology. As shown, when the window 201 is in the second closed position, the top edge of the window 201 is raised into a higher position than when the window 201 is in the first closed position described above with respect to FIG. 2B. Thus, while the first closed position is effective at creating an environmental seal that prevents water and other such environmental elements from entering the vehicle about the window 201, placing the window 201 in the second closed position as shown in FIG. 2C is effective at further securing the window 201 and preventing buffeting. Raising the window in this manner compresses the pillow 217 of the secondary seal 215 around the upper surface of the window 201 and causes the lip 218 of the secondary seal 215 to push inwards against the outer surface of the window 201 to secure the window 201 in place. When the upper edge of the window 201 pushes into the pillow 217 of the secondary seal 215, the lower wall of the pillow 217 will compress inwards into the compartment 222 and the indentation 221 of the secondary seal 215 will cause the lip 218 to bend inwards towards the window, causing the lip 218 to contact and securely grip the outer surface of the window 201. In other words, the indentation 221 may provide a bend point in the structure of the secondary seal 215 that allows the secondary seal 215 to compress in a manner that more effectively guides the lip 218 towards the window 201, allowing for the secondary seal 215 to more securely prevent lateral movement of the window 201 at high speeds. Thus, the compression of the pillow 217 of the secondary seal 215 around the window 201 holds the window 201 in place at higher speeds and prevents the air from causing the window to buffet. According to some embodiments, the second closed position of window 201 may be 3 mm higher than the first closed position of window 201.

Optionally, in some embodiments, the secondary seal 215 may lack the lip 218 shown in FIG. 2C and the window 201 may be designed to be guided slightly inboard (e.g., toward the inside of the vehicle) at the highest points of its travel to allow the pillow 217 of the secondary seal 215 to form a lip around the window 201. Therefore, as the window compresses the secondary seal 215, this additional inboard distance allows the secondary seal 215 to further grip around window 201 slightly more than if the window was parallel with the top edge of the vehicle body 205. Causing the window 201 to move slightly inboard at the top of travel may be achieved using a window guide, as described further below. In some embodiments, the window guide may cause the window 201 to move from a first lateral position when the window 201 is in the first closed position to a second lateral position when the window 201 is in the second closed position. As shown by FIG. 2B, when in the first closed position, the external surface of the window 201 may be flush or substantially flush with the outer surface of the vehicle body 205 (i.e., the roof of the vehicle) along an axis. However, optionally, according to some embodiments, when in the second closed position, the external surface a top portion of the window 201 may be shifted inwards towards the inside of the vehicle, such that the outer edge of the top of the window 201 may be inset by a predetermined distance from the axis of the vehicle body. As shown in FIG. 2C, when placed in the second closed position, a pillow 217 of the secondary seal 215 is compressed and causes the secondary seal 215 to push out and cause the lip 218 to grip the top portion of the window 201. Similarly, in embodiments where the window is guided slightly further inboard, when in the second closed position, a portion of the secondary seal 215 closes the predetermined distance of the inset to press against the outer surface of the window 201 and secure the window 201 in place to prevent buffeting of the window 201. In some embodiments, by the secondary seal 215 compressing around the top edge of the window 201 allows the combination of the secondary seal 215 and window 201 remain flush or substantially flush with the surface of the vehicle body 205.

Figure 2D:
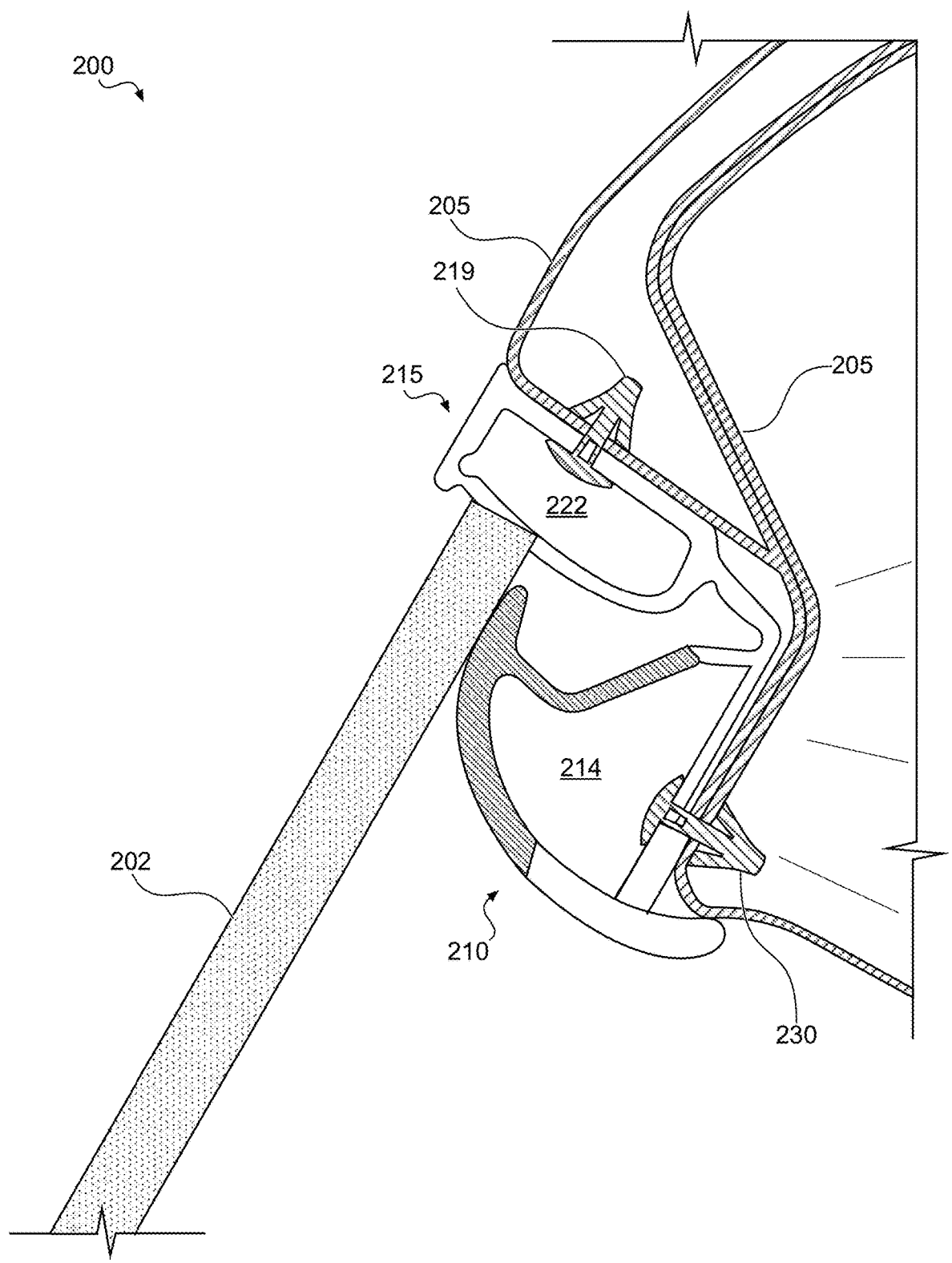
FIG. 2D is an illustration of a seal and substantially flush glass window design for partially frameless windows on an automobile at cross-section B in accordance with certain embodiments of the disclosed technology.

FIG. 2D illustrates a window seal of an automotive window at cross-section B of FIG. 1, which is a cross-section of a framed/framing portion of the front door (e.g., a cross section of front door 102 at a location between the first framing portion 104 and the rear edge 108 of the front door 102 as shown in FIG. 1) that includes a trim piece 202 of the door, in accordance with certain embodiments of the disclosed technology. The trim piece 202 may be disposed on the outer side of a vehicle door body and may be sealed with the vehicle body 205 using primary seal 210 and secondary seal 215. In other words, when the door is in a closed position, the primary seal 210 and secondary seal 215 may be positioned to receive the trim piece 202 of the door such that a portion of each of the primary seal 210 and secondary seal 215 compress against the trim piece 202 to create watertight seals. In some embodiments, the trim piece 202 may not contact the secondary seal 215 but may be separated from the secondary seal 215 by a slight gap. In other embodiments, the trim piece 202 shown in FIG. 2D may alternatively be a portion of the body of the door or the door frame (e.g., if the door does not have a trim piece). Primary seal 210 and secondary seal 215 may include retaining shapes in order to attach the seals respectively to the vehicle body 205. For example, the secondary seal 215 may be attached to the vehicle body by a retaining shape 219 described previously above with respect to FIG. 2A. The primary seal 210 may be attached to the vehicle body 205 with a retaining shape 230 similar to the retaining shape 219 used to attach the secondary seal 215 to the vehicle body 205. As such, at cross-section B, the primary seal 210 may not include the U-shaped portion 213 shown in FIGS. 2A-2C. In some embodiments, the primary seal 210 may be through-hole mounted or clipped into the vehicle body 205 by the retaining shape 230, which may be of integral construction with the primary seal 210 such that the primary seal 210 and retaining shape 230 are one piece. In other words, in some embodiments, the retaining shape 230 may extend through a through-hole of the vehicle body 205 and anchor or otherwise secure the primary seal 210 to the surface of the vehicle body 205. According to some embodiments, the vehicle body 205 may have a plurality of through-holes aligned across the vehicle body 205 and the primary seal 210 may include a corresponding number of retaining shapes 230 for securing the primary seal 210 to the vehicle body at each of the plurality of through-holes. Thus, according to some embodiments, the primary seal 210 may have two different profiles connected via a transitional area, the first of which as shown in FIG. 2A and the second of which is shown in FIG. 2D. The different profiles may be connected by a rubber mold that isolates the latching area of the doors (e.g., such as latch striker plate seal 412 shown in FIG. 4). Similarly, secondary seal 215 may transition from the shape shown in FIG. 2D to the shape shown in FIG. 2A (with or without finger 216) as the secondary seal 215 extends along the edge of vehicle body 205. In some embodiments, the window may extend all the way to the end of each door and replace vehicle trim 202. Vehicle trim 202 may be glass or other automotive materials, such as plastic.

As previously stated, a vehicle door described herein may include a framing portion and an unframed portion (i.e., at the top edge of the window). As the vehicle body 205 may include a latch striker plate positioned in an area proximate to the framing portion of the front and rear doors (e.g., such as latch striker plate 420 in FIG. 4) when closed, the lip 206 of the vehicle body 205 used to attach the primary seal 210 may not be present along the portion of the vehicle body 205 that is proximate to the latch striker plate, and as such, the primary seal 210 may be attached to the vehicle body 205 in a different manner along this portion of the vehicle body 205. Accordingly, in some embodiments, the primary seal 210 may have one or more differences between portions designed to seal the frameless window 201 and portions designed to seal a framed/framing portion of the door. For example, according to some embodiments, the primary seal 210 may transition from being mounted to a lip 206 (e.g., via U-shape portion 213 of the primary seal 210), as shown in FIG. 2A, to being through-hole mounted or clipped into the vehicle body 205, as shown in FIG. 2D (e.g., via retaining shape 230 of the primary seal 210). There may be a rubber molding or rubber transition piece or area in between the cross-sections of primary seal 210 presented in FIG. 2A and FIG. 2D to allow the primary seal 210 to form a continuous barrier with two different methods of attachment. The lip 206 of the vehicle body 205 may be proximate to the frameless portion of the window (when the vehicle door is closed), but may not extend along a portion of the vehicle body 205 that is proximate to the framing portion of the door body (when the vehicle door is closed). According to some embodiments, the rubber molding/transition piece and the portion of the primary seal 210 that is through-hole mounted or clipped into the vehicle body 205 may be positioned proximate the framed portion(s) of the window(s) when the door(s) are closed. For example, in some embodiments, the through-hole mounted or clipped portion (i.e., the portion secured by retaining shape 230) of the primary seal 210 may be positioned along a portion of the vehicle roof corresponding to an area between the second framing portion 106 of the front door 102 and the second framing portion 116 of the rear door 112, shown in FIG. 1. Thus, according to some embodiments, the primary seal 210 may be made up of a first portion that is mounted to a lip 206 of the vehicle body 205, wherein the first portion is configured to engage at least a portion of a frameless portion of the window 201, a second portion that is through-hole mounted or clipped into the vehicle body 205, wherein the second portion is configured to engage at least a portion of the framing portion of the door body (e.g., a portion of the door body positioned between the second framing portion 106 and the rear edge 108 of the front door 102 as shown in FIG. 1) and a transitional portion positioned between the first portion and the second portion that allows the primary seal 210 to form a continuous barrier. According to some embodiments, a transitional portion of the primary seal 210 may correspond to an area of the door where the door transitions from a frameless window to the framing portion of the door. Accordingly, it will be understood that the primary seal 210 may include a first transitional area at a framing portion of the front door (e.g., second framing portion 106 shown in FIG. 1) and a second transitional area at a framing portion of the rear door (e.g., second framing portion 116 shown in FIG. 1).

In some embodiments, the vehicle body 205 may include one or more door latch strikers positioned at a location proximate to the transitional portion of the primary seal 210. For example, in some embodiments, the vehicle body 205 may include a first upper door latch striker configured to latch to the front door and a second upper door latch striker configured to latch to the rear door, where the first and second upper door latch strikers are positioned proximate to the transitional portion of the primary seal 210. The vehicle body 205 may include a door latch striker plate having one or more door latch strikers. For example, a door latch striker plate with one or more door latch strikers may be positioned just below the roof of the door body proximate a framing portion of the front and/or rear doors. In some embodiments, a first and second upper door latch strikers may be positioned proximate a portion of the primary seal 210 that is through-hole mounted or clipped into the vehicle body 205. In some embodiments, a first upper door latch striker may be positioned at a first transitional portion of the primary seal 210 at a framing portion of the front door and a second upper door latch striker may be positioned at a second transitional portion of the primary seal 210 at a framing portion of the rear door.

Although FIGS. 2A-2D describe a continuous primary seal 210 having two different attachment profiles separated by a transitional area, in other embodiments where, for example, the latch striker plate is positioned in a different location, the primary seal 210 may instead have a single attachment profile. For example, in some embodiments, the lip 206 of the door body 205 may extend across the entire length of the roof such that the entirety of the primary seal 210 may be attached at the lip 206 in a manner similar to that shown in FIGS. 2A-2C. Alternatively, in some embodiments, instead of the door body 205 including a lip 206, the length of the door body 205 (e.g., roof) may include a plurality of through-holes such that the entirety of the primary seal 210 may be attached to the door body 205 using a plurality of retaining shapes 219 similar to that shown in FIG. 2D.

Figure 3:
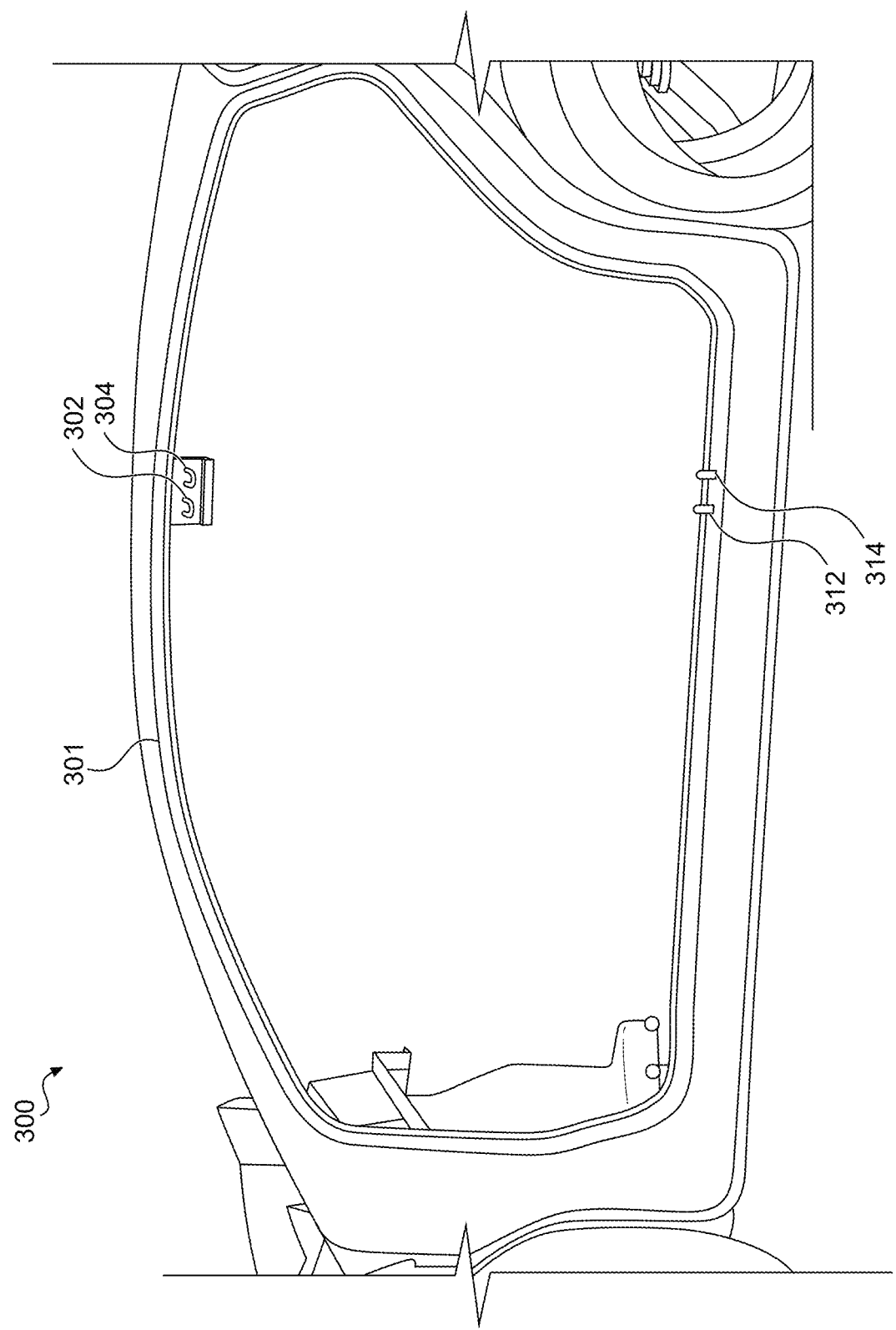
FIG. 3 is an illustration of a vehicle body having latch strikers, in accordance with certain embodiments of the disclosed technology.
Figure 5:
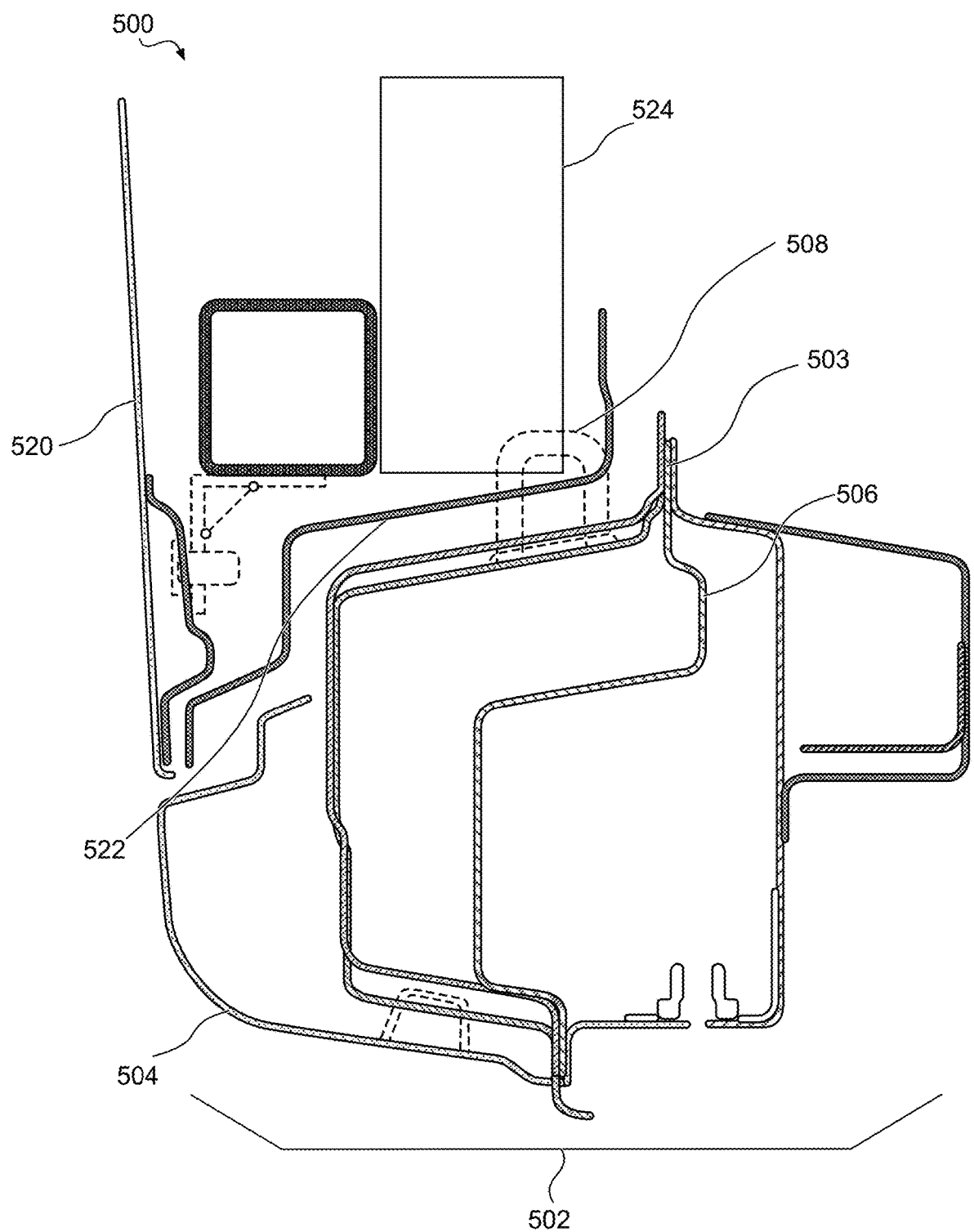
FIG. 5 is an illustration of a cross-sectional illustration of a lower door latch system, in accordance with certain embodiments of the disclosed technology.

FIG. 3 illustrates a vehicle body 300 having a door ring 301 that is constructed of one continuous piece. In some embodiments, the door ring 301 may be assembled from many pieces. According to some embodiments, one or more of the primary seal 210 and the secondary seal 215 of FIGS. 2A-2D may extend all the way around the door ring 301. As shown by FIG. 3, in some embodiments, the vehicle body 300 may include a first upper door latch striker 302 and a second upper door latch striker 304 positioned on a striker plate extending beneath the roof of the vehicle. The pair of upper door latch strikers 302, 304 may be positioned at a location corresponding to the transitional portion of primary seal 210 depicted in FIG. 2D and discussed previously above. Although FIG. 3 depicts the pair of upper door latch strikers 302, 304 as horizontally oriented U-shape members, it should be understood that in various other embodiments the strikers may have different shapes and/or orientations. The first upper door latch striker 302 may engage with a latching mechanism of the front door when closed and the second upper door latch striker 304 may engage with a latching mechanism of the rear door when closed. Similarly, the vehicle body 300 may include a first lower door latch striker 312 and a second lower door latch striker 314 designed to engage with latching mechanisms of the front door and rear door when closed, respectively. The first and second door latch strikers 312, 314 may be positioned on a lower rocker of the vehicle body 300 as shown in FIG. 5.

The front door (not pictured in FIG. 3) may have an upper latching mechanism designed to latch onto the first upper door latch striker 302 and a lower latching mechanism designed to latch onto the first lower door latch striker 312. Similarly, the rear door (not pictured in FIG. 3) may have an upper latching mechanism designed to latch onto the second upper door latch striker 304 and a lower latching mechanism designed to latch onto the second lower door latch striker 314. According to some embodiments, the pair of lower door latch strikers 312, 314 may be positioned directly below the pair of upper door latch strikers 302, 304. When the front door is closed, it may be securely latched to the vehicle body 300 at the first upper door latch striker 302 and the first lower door latch striker 312. Similarly, when the rear door is closed, it may be securely latched to the vehicle body 300 at the second upper door latch striker 304 and the second lower door latch striker 314. As will be appreciated, the latches on a door may be disengaged by a user engaging a door handle or other door opening mechanism. According to some embodiments, the latches associated with the front door may operate independently from the latches associated with the rear door. In other words, when the front and rear doors are both in a closed position with all latches engaged, when a user opens the front door, only the latches associated with the front door will disengage from their respective strikers 302, 312 without affecting the state of the rear door latches, and vice versa. Thus, the latch configuration of the doors may allow the front and rear door to be opened and secured closed independently from one another.

Figure 4:
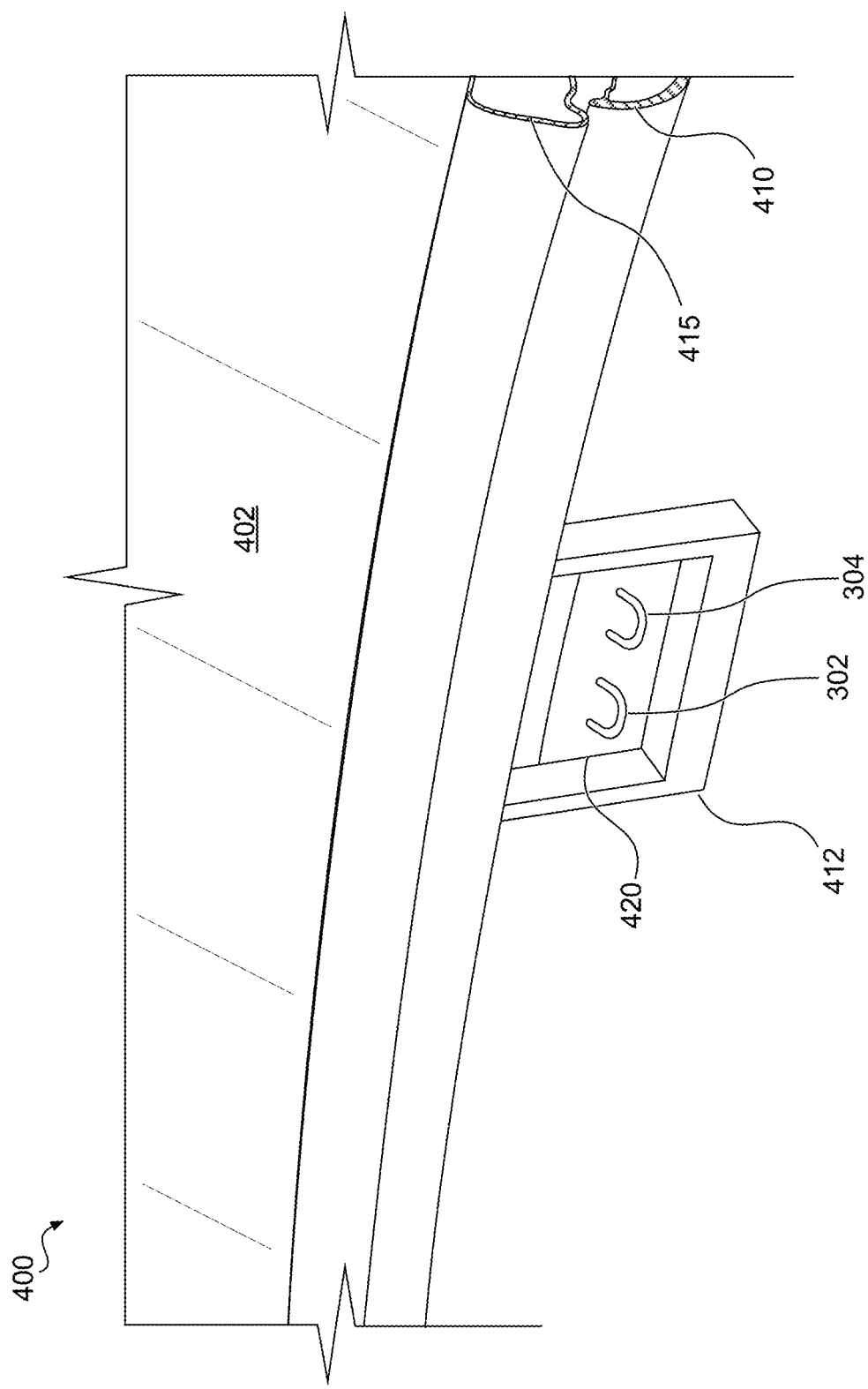
FIG. 4 is an illustration of a vehicle body having a seal design for partially frameless windows and latch strikers, in accordance with certain embodiments of the disclosed technology.

FIG. 4 illustrates an enlarged view of a portion of FIG. 3, showing a vehicle body 400 having a seal design for partially frameless windows and latch strikers 302, 304 as previously described with respect to FIG. 3. The vehicle body 400 includes a vehicle roof 402. According to some embodiments, the vehicle roof 402 may correspond to a portion of the vehicle body 205 shown in FIGS. 2A-2D. A secondary seal 415 and a primary seal 410 may be mounted or positioned below the vehicle roof 402 in a manner that may be similar or identical to the design and/or operation of secondary seal 215 and primary seal 210 described previously above with respect to FIGS. 2A-2D. The primary seal 410 and secondary seal 415 may continuously extend across the length of the roof 402. Further, as shown in FIG. 4, the primary seal 410 may include a latch striker plate seal 412 that extends beneath the lengthwise body of the primary seal 410 and around a latch striker plate 420 that may include a pair of upper door latch strikers 302, 304. The latch striker plate seal 412 may be integrated into the lengthwise body of the primary seal 410 such that the entirety of the primary seal 410, including the latch striker plate seal 412, is made of one continuous piece of material (e.g., a single piece of rubber). Thus, in some embodiments, the latch striker plate seal 412 may be of integral construction with the primary seal 410. According to some embodiments, the latch striker plate seal 412 may be a rounded or squared U-shape seal around the latch striker plate 420. The primary seal 410, including the latch striker plate seal 412 may provide a seal around the entire latch striker plate 420. According to some embodiments, the latch striker plate seal 412 portion of the primary seal 410 may be located at the transitional area of the primary seal 410 and the portion of the primary seal 410 adjacent to the latch striker plate 420 may have an attachment profile as described above with respect to the portion of the primary seal 210 shown in FIG. 2D. The portions of the primary seal 410 on either side of the latch striker plate 420 and latch striker plate seal 412 may have an attachment profile as described previously above with respect to FIGS. 2A-2C. According to some embodiments, when a latch striker plate 420 is positioned at the transitional portion of the primary seal 410, the area may be sealed with a rubber mold along with a small, extruded seal (e.g., latch striker plate seal 412 shown in FIG. 4), which may provide both a seal (e.g., a watertight seal) around the latch striker plate 420 and improved aesthetics by hiding the sheet metal edges of the vehicle body. The sealing mechanisms described herein effectively combine the strengths of both frameless and framed concepts for efficient door sealing.

The latch striker plate 420 may be attached to a portion of the vehicle body 205 and positioned at a location such that the door latch strikers 302, 304 align with latching mechanisms of the front and rear doors when closed. By allowing the front door 102 and/or rear door 112 to latch to the vehicle body 205 via the door latch strikers 302, 304 when the doors are closed, the latching mechanism(s) may secure the door (s) to the vehicle body 205 in a manner that is sufficient to transfer loads between the structure(s) of the doors (e.g., the quasi-B-pillar) to the vehicle body 205 to provide the structural support typically provided by a conventional B-pillar that is integrated into the body of the vehicle as a static construction.

FIG. 5 illustrates a cross-sectional illustration of a lower door latch system 500, in accordance with certain embodiments of the disclosed technology. The lower door latch system 500 may include a rocker panel or rocker 502 having a lip 503, an outer rocker trim piece 504, one or more structural pieces 506 and may include a lower door latch striker 508. According to some embodiments, the lip 503 may be used to attach a seal. For example, in some embodiments, the lip 503 may correspond to the lip 206 of FIGS. 2A-2C. In other words, in some embodiments, the lip 206 of FIGS. 2A-2C may extend all the way around the door ring of the vehicle (with the exception of the portion of the door ring corresponding the transitional area discussed with respect to FIG. 2D). Thus, in some embodiments, the primary seal 210 shown in FIGS. 2A-C may extend continuously around the door ring by attaching to the lip 206, 503 for the majority of the door ring and by being clipped into the vehicle body at the transitional area as previously described above. According to some embodiments, a door body defined by an outer surface 520 and a lower surface 522 may house a door body structure 524 containing a latching mechanism (not shown) that is designed to securely latch onto the lower door latch striker 508 when the door is closed. In some embodiments, the lower door latch striker 508 may be the same as one of the first lower door latch striker 312 or the second lower door latch striker 314 shown in FIG. 3 and described previously above.

Figure 6:
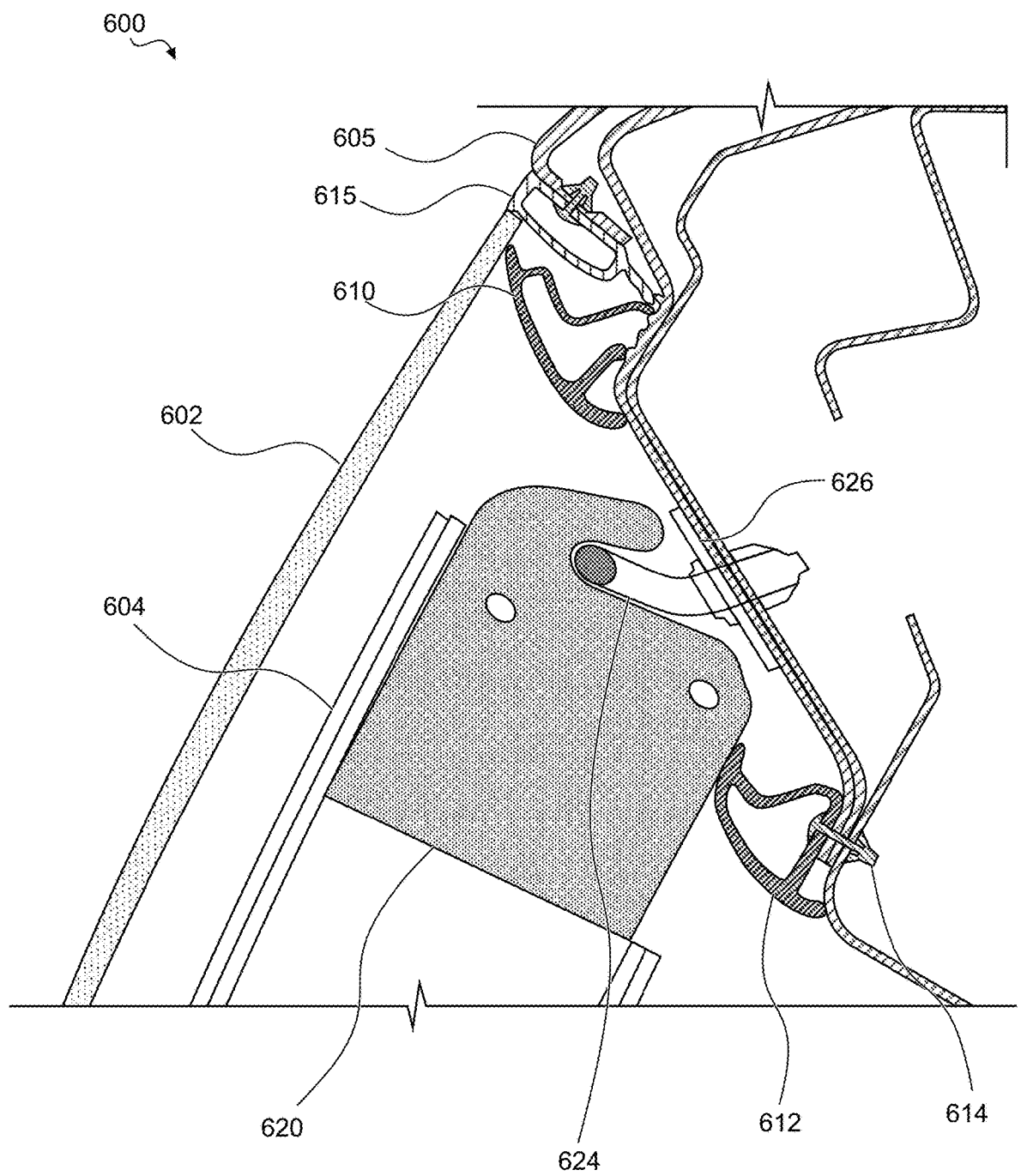
FIG. 6 is a cross-sectional illustration of a window seal system integrated with an upper latch striker, in accordance with certain embodiments of the disclosed technology.

FIG. 6 illustrates a window seal system 600 integrated with an upper latch striker at cross-section B of FIG. 1, in accordance with certain embodiments of the disclosed technology. As shown, the window seal system 600 includes a primary seal 610 and a secondary seal 615 attached to a vehicle body 605 and that are designed to receive a trim piece 602 of a door, similar to the window seal system 200 shown in FIG. 2D. Although FIG. 6 does not show the primary seal 610 being clipped into the vehicle body 605 using a retaining shape, such as the retaining shape 230 shown in FIG. 2D, it should be understood that it is contemplated that the primary seal 610 would be attached to the vehicle body 605 in a manner similar to that shown in FIG. 2D. Thus, in some embodiments, the primary seal 610 may be clipped into the vehicle body 605 using a retaining shape similar to that of retaining shape 230 of FIG. 2D.

The window seal system 600 further includes an internal door structure 604 attached to a latching mechanism 620 that is designed to latch to an upper door latch striker 624 when the door is closed and disengage the upper door latch striker 624 when the door is being opened. The upper door latch striker 624 may be positioned on a latch striker plate 626. The upper door latch striker 624 may be the same as one of the upper door latch strikers 302, 304, and the latch striker plate 626 may be the same as the latch striker plate 420 illustrated in FIGS. 3 and 4. The window seal system 600 may include an upper latch seal 612 positioned to receive the latching mechanism 620 as shown. The upper latch seal 612 may have a similar design or structure to the primary seal 610 shown in FIG. 6 or primary seal 210 shown in FIG. 2D. According to some embodiments, the upper latch seal 612 may be attached to the vehicle body 605 in a manner similar to that of the primary seal 210 shown in FIG. 2D. Thus, in some embodiments, the upper latch seal 612 may be through-hole mounted or clipped into the vehicle body 605 by a retaining shape 614 that may be similar to the retaining shape 230 of FIG. 2D. In some embodiments, the vehicle body 605 may include one or more through-holes proximate the latch striker plate 626 and the upper latch seal 612 may include a corresponding number of one or more retaining shapes 614 that are through-hole mounted through the through-holes to secure the upper latch seal 612 around the latch striker plate 626. In alternate embodiments, the latch striker plate 626 or vehicle body 605 may include a lip that allows the upper latch seal 612 to be attached around the latch striker plate 626 in a manner similar to the attachment of the primary seal 210 shown in FIGS. 2A-2C. According to some embodiments, the upper latch seal 612 extends along the bottom length of the latch striker plate 626 and up either side of the latch striker plate 626 and connects with the primary seal 610 in a manner similar to how the latch striker plate seal 412 is attached to the lengthwise body of the primary seal 410 as shown in FIG. 4. In this manner, the upper latch seal 612 and primary seal 610 may form one continuous seal that serves to seal the latch striker plate 626 and seal the length of the roof of the vehicle as shown in FIG. 4.

Figure 7A:
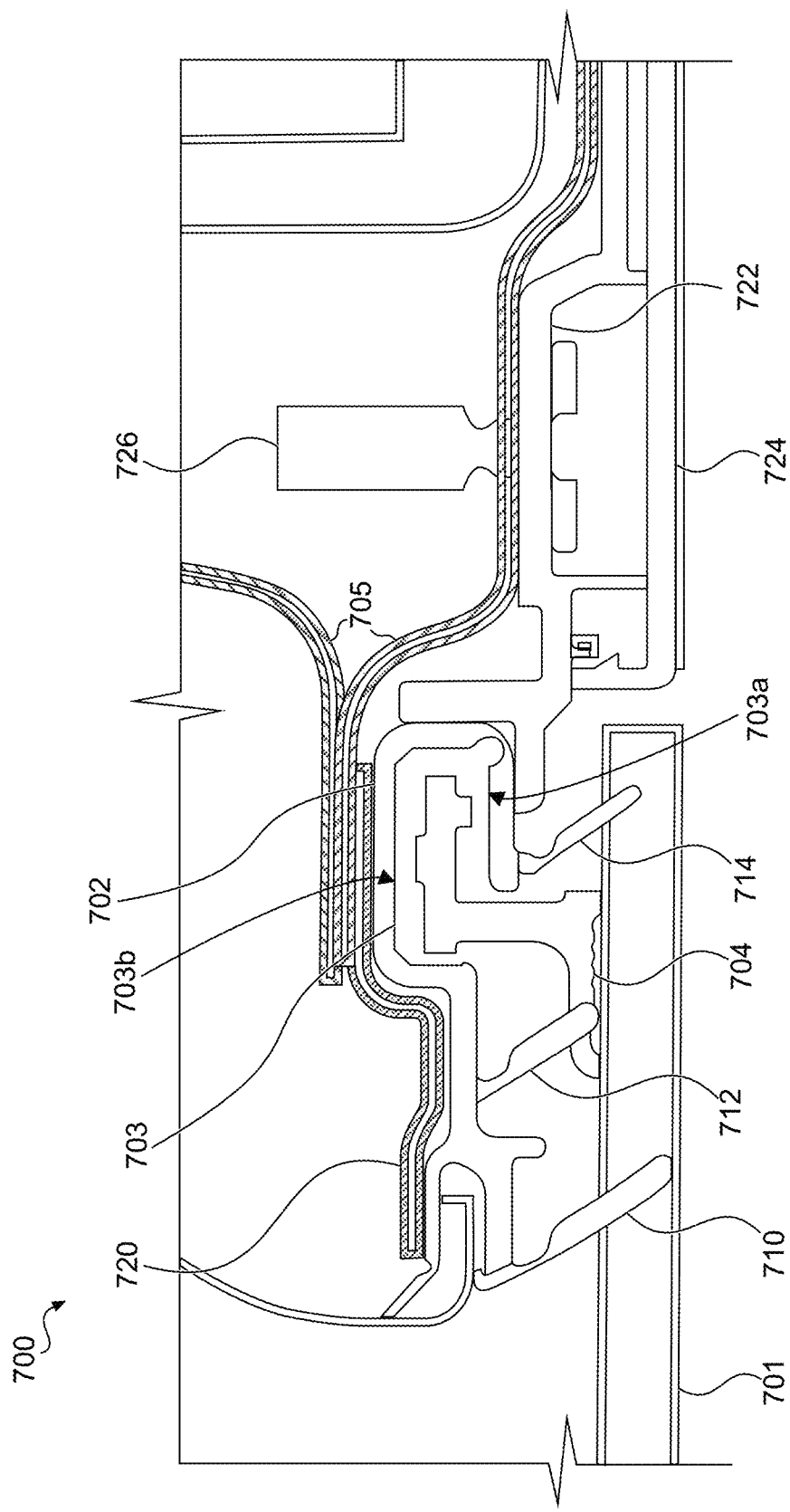
FIG. 7A is an illustration of a seal and substantially flush glass window and trim design for partially frameless windows with a window in a down position on an automobile at cross-section C, in accordance with certain embodiments of the disclosed technology.
Figure 10A:
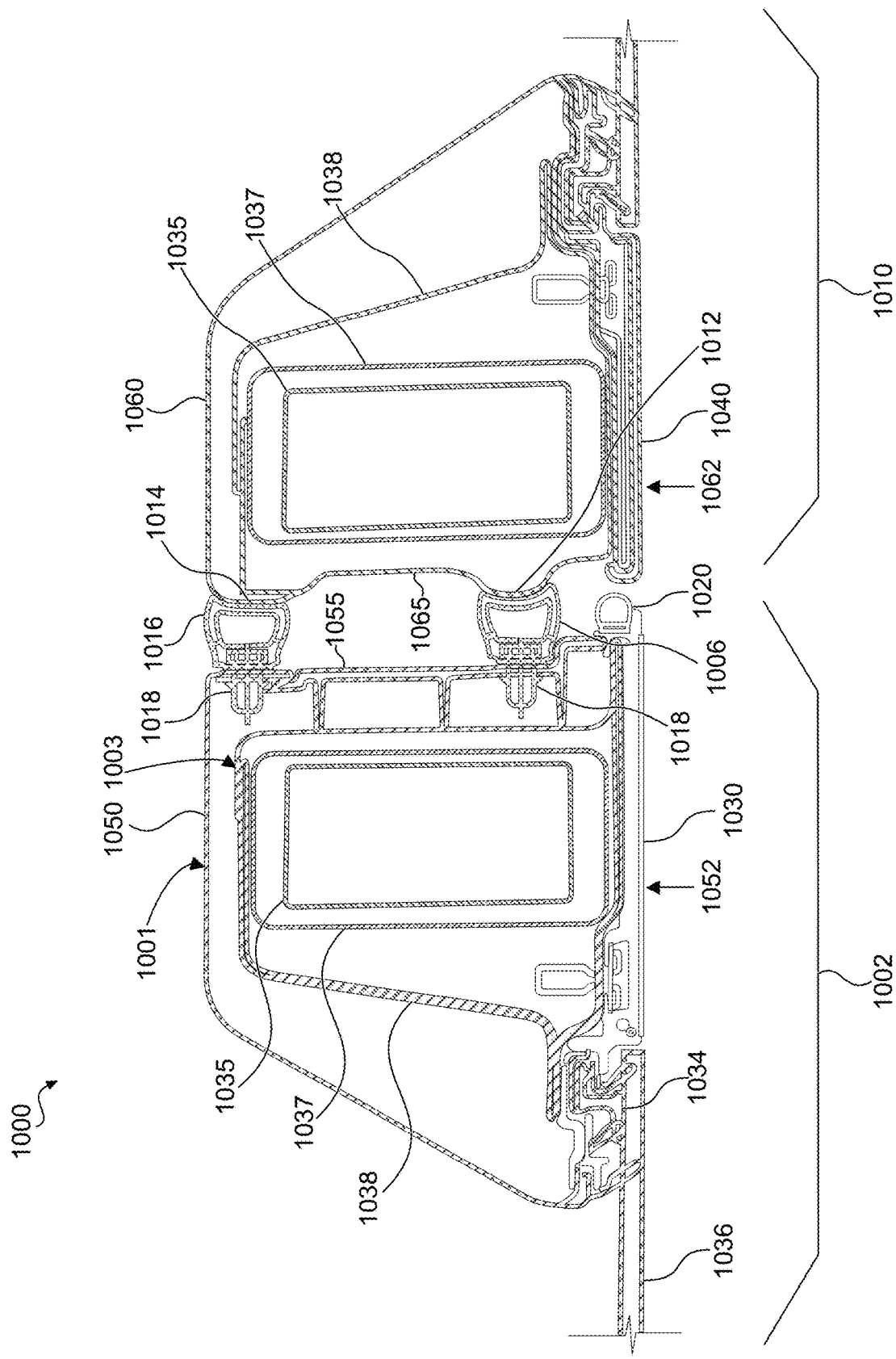
FIG. 10A is an illustration of a seal and door structure for side barn doors on an automobile at cross-section C in accordance with certain embodiments of the disclosed technology.

FIG. 7A illustrates a seal and substantially flush glass window and trim design 700 for partially frameless windows on an automobile at cross-section C, in accordance with certain embodiments of the disclosed technology. FIG. 7A shows a cross-sectional view of a portion of a vehicle front door that depicts a portion of the front window 701 in an open or a semi-closed position and the framing portion of the door (e.g., similar to the second framing portion 106 of front door 102 shown in FIG. 1) that includes trim and internal structures. As shown in FIG. 7A, an outer surface of the front window 701 may be flush with the outer surface of the door frame (i.e., the outer surface of exterior trim piece 724), providing for efficient aerodynamics and noise-reduction while the vehicle is in motion. Although not shown in FIG. 7A, the rear door of the vehicle may have a similar, mirrored design to that shown in FIG. 7A with respect to the operation of the window, insert and associated seals, as shown in FIG. 10A. FIG. 7A is an enlarged image of a portion of FIG. 10A.

As shown in FIG. 7A, the framing portion of the front door may have a structure that includes a window assembly track 702 that is attached to a bracket 720 and an interior retaining piece 722, a mounting bolt 726 that bolts the interior retaining piece 722 to the internal door structure, and an exterior trim piece 724 attached to the interior retaining piece 722. The window assembly track 702 may be made of a hard plastic or hard rubber material and may include one or more lips or seals (e.g., first seal 710, second seal 712 and/or third seal 714) that extend outwards towards the window 701 and/or insert 704. The lips/seals (e.g., first, second and third seals 710, 712, 714) may be made of a soft rubber that is flexible. The window assembly track 702 and one or more of the first seal 710, second seal 712 and/or third seal 714 may be extruded together. The bracket 720 may be a metallic or plastic carrier that seals against other constituent components and may be attached to the internal structure 705 of the framing portion of the door. In some embodiments, the bracket 720, window assembly track 702 and seals (e.g., first, second, third seals 710, 712, 714) may be integrated as one piece and may be referred to as a glass run seal. According to some embodiments, the interior retaining piece 722 may be a trim carrier and may contribute to the formation of a quasi-B-pillar when the front and rear doors are closed. In other words, in some embodiments, the interior retaining piece 722 may be of sufficient strength and thickness to provide structural support for a quasi-B-pillar formed when both the front door and rear door of the vehicle are closed together, while also being configured to hold the exterior trim piece 724 in place, which, due to the disclosed design and assembly process can be a thin piece of trim that allows for improved positioning of an anti-pinch switch, as described further below.

The design shown in FIG. 7A may be assembled by first positioning the window assembly track 702 against the bracket 720 so that a portion of the bracket 720 is positioned between the internal structure 705 and the window assembly track 702, or in embodiments where the bracket 720 is of integral construction with the window assembly track 702, placing the bracket 720 and window assembly track 702 in the same position and attaching the bracket 720 to the internal structure 705. Next the window 701 is mounted by inserting a guiding plastic insert 704 attached to the window 701 into a cavity (e.g., window guide 703) formed by the window assembly track 702. Next, the interior retaining piece 722 is positioned and bolted into the internal structure 705 using mounting bolt 726, thereby securing the window assembly track 702 in place. This aligns the window 701 glass in the proper "X" and "Y" positions so that, for example, the exterior of the window 701 will be flush with the exterior of the door trim and flush or substantially flush with the vehicle body 205 (e.g., the roof). Next, the exterior trim piece 724 may be clipped into the interior retaining piece 722, concealing the fixations behind it and providing a clean external appearance. This method of assembly allows for a thin exterior trim piece 724 to be utilized, which, as shown in FIG. 10A, allows for space for an anti-pinch switch 1020 to be mounted just inside the thin exterior trim piece 724 at a location that is closer to the external surface of the door, thereby allowing the anti-pinch switch 1020 to be proximate to the external surface of the door so that the anti-pinch switch 1020 may more easily detect objects and operate more effectively. According to some embodiments, this design may allow the anti-pinch switch 1020 to be positioned approximately 2 mm from the exterior surface of the vehicle (e.g., the exterior surface of front trim piece 1030), whereas conventionally such anti-pinch switches positioned at this location would be 8 mm or more from the exterior surface of the door. The anti-pinch switch 1020 may operate in conjunction with a soft-close door system of the vehicle and may include a pressure sensor that upon detecting the presence of an object (e.g., a user's finger) between the doors may cause the soft-close door system to prevent a door from closing. Thus, the anti-pinch switch 1010 may be communicatively connected to a control system of a soft-close door system to relay sensor data to the soft-close door system.

According to some embodiments, each of the window assembly track 702, bracket 720, interior retaining piece 722 and the exterior trim piece 724 may extend vertically along the framing portion of the door. For example, one or more of the window assembly track 702, bracket 720, interior retaining piece 722 and the exterior trim piece 724 may extend vertically from the bottom of the vehicle door (e.g., proximate the floor) to the top of the vehicle door (e.g., proximate the roof) or from a height above the floor of the vehicle (e.g., beginning at the height of the door at which the bottom of the window 701 is positioned when the window 701 is in a completely open position). For example, in some embodiments, one or more of the window assembly track 702 and bracket 720 may not extend from the floor may begin extending from a height of the door corresponding approximately to a location proximate to where the bottom of the window is positioned when the window is in a fully open (e.g., down) position and the door may contain other structure beneath this position to prevent the window from moving any lower. The window assembly track 702 forms a cutout or window guide 703, which may be a cavity in the vehicle door structure designed to receive an insert 704. The insert 704 may be made of plastic or a similar material. The insert 704 may be attached (e.g., glued) to an internal edge of the window 701. The window guide 703 may be shaped to receive and laterally constrain the insert 704, while allowing the insert 704 to move vertically within the cavity. The insert 704 may be inserted into the window guide 703, which may serve to vertically guide the movement of the insert 704 within the window guide 703. In some embodiments, the insert 704 may be shaped to fit into a cavity of the window guide such that it may move vertically within the cavity while its horizontal/lateral movement is restrained by the walls of the cavity. For example, in some embodiments, the window guide 703 may include a narrow channel leading into a wide cavity and the insert 704 may correspondingly have a shape including a narrow neck positioned within the narrow channel and a wide body that fits within the wider cavity. Although FIG. 7A shows that the insert 704 has a certain amount of space within the window guide 703 between the edges of the insert 704 and the walls of the window assembly track 702, it will be appreciated that the body of the insert 704 may be larger or have a different shape so as to provide less or little space between the insert 704 and the walls of the window assembly track 702. As will be understood, the insert 704 will be retained within the window guide 703 because the wide body of the insert 704 will be constrained within the wide cavity of the window guide 703 because it is too large to be pulled out of the narrow channel. Thus, once inserted, the insert 704 will be secured within the window guide 703 formed by the walls of the window assembly track 702. In some embodiments, a portion of the insert 704 (e.g., the wide body described previously) may have a shape that is similar to the shape of the cavity of the window guide 703. As the insert 704 is attached to the window 701, the movement of the insert 704 will correspond to the movement of the window 701 such that the insert 704 and window 701 will move up and down together in unison. This may allow the window 701 to move up and down while still being retained by the structure of the framing portion of the front door to achieve free vertical movement of the window 701 (until being completely open or completely closed) while restraining lateral movement of the window 701.

Some embodiments may further comprise one or more seals used to prevent water or environmental conditions from entering the vehicle. For example, the window assembly track 702 may include one or more of a first seal 710, a second seal 712 and a third seal 714, some or all of which may be extruded together with the window assembly track 702. The first seal 710, second seal 712 and third seal 714 may all be internal to or behind the position of the window 701, as shown in FIG. 7A. The first seal 710 may be positioned along an outer edge of the window assembly track 702 in the direction of the front of the vehicle and in addition to providing an aesthetic benefit of hiding the internal structures of the door (e.g., window assembly track 702) may also provide act to prevent water, dirt and wind from passing by the seal, thereby providing protection against the external environment and reducing noise from airflow. The second seal 712 may be positioned towards the middle of the window assembly track 702 at an area proximate the insert 704 and may provide stability to the insert 704 as well as additional layer of protection against wind and water. The third seal 714 may be positioned towards an edge of the window assembly track proximate to the rear-most edge of the front window 701 and may serve to provide a barrier against water, dirt and wind. Each of the first, second and third seals 710, 712, 714 may serve to form a water resistant or watertight barrier at their respective locations along a vertical length of the framing portion of the front door. As shown, each of the first, second and third seals 710, 712, 714 may include a thin portion (which may be referred to as a "neck") that provides an inflection point about which each seal may bend to cause the seals to bend in a particular way as discussed further below. Although the embodiment shown in FIGS. 7A and 7B includes the first seal 710, second seal 712 and third seal 714, some other embodiments may not include the second seal 712 but may only include the first and third seals 710, 714.

The positioning of the third seal 714 behind the window 701 proximate to the edge of the window is particularly advantageous because not only does it provide for enhanced aesthetics by concealing the seal behind the window 701, it also provides for an open channel between the edge of the window 701 and the edge of the adjacent exterior trim piece 724, which provides for better water management by using the space between the window 701 and the structure of the framing portion of the door (e.g., interior retaining piece 722 and exterior trim piece 724) as a channel for directing the water. The channel may be configured to direct fluid externally away from the body of the vehicle by, for example, directing the fluid to fall to the ground on the outside of the vehicle. Conventional approaches do not include this open channel, but rather typically position a seal between the window and the trim, which is problematic because during wet and cold whether the seal can freeze the window to the trim of the vehicle, preventing a user from opening the window or risking damage to the window/vehicle when opening. The disclosed design is also more durable than conventional designs that position a seal between the window and the trim because in conventional designs when the window moves up and down it typically cuts into the seal, slowly wearing away at the seal. Furthermore, in some embodiments, by positioning the third seal 714 behind the window 701, there is no clip required to hold the seal to an edge of the door, thereby allowing for a more compact design.

Figure 7B:
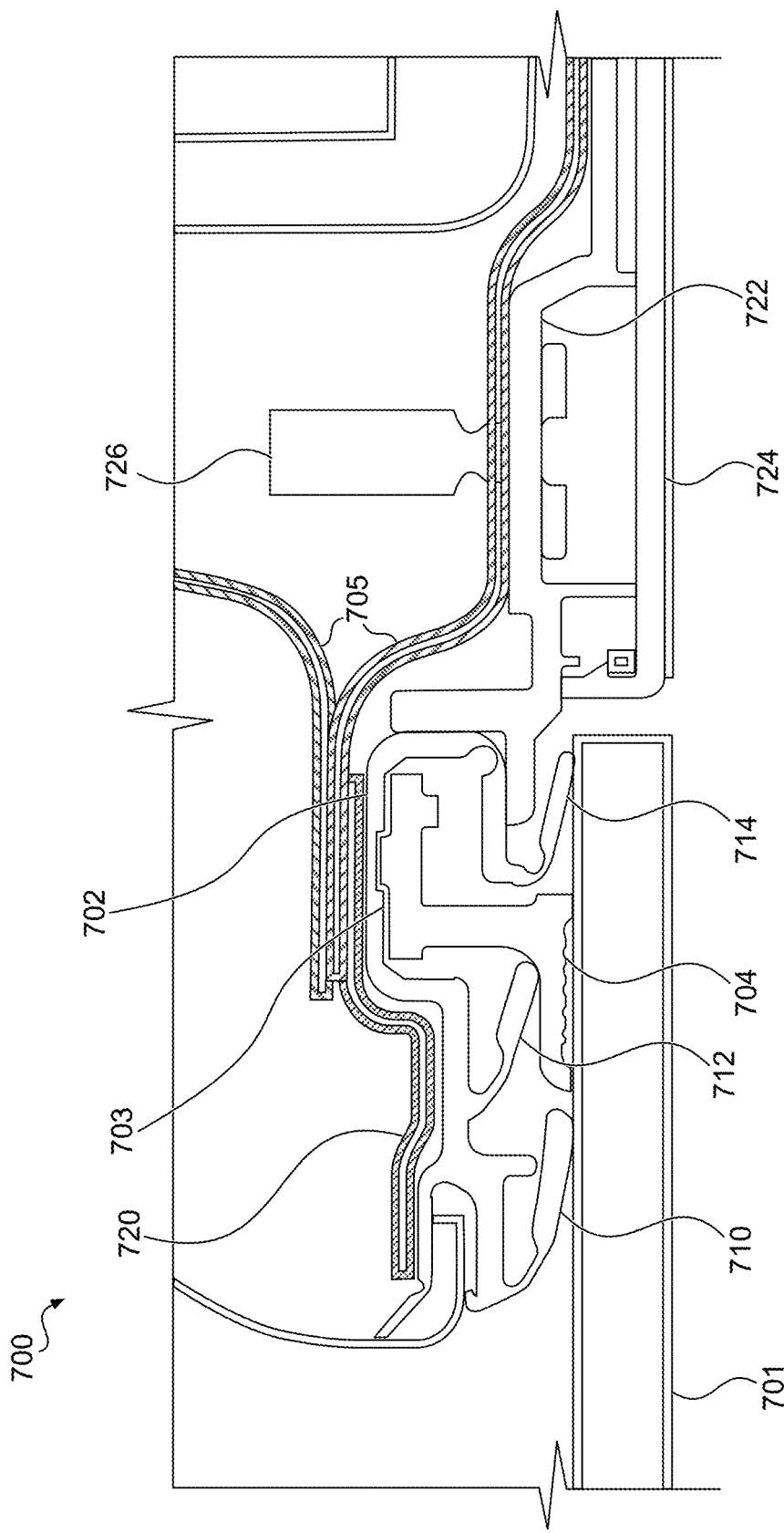
FIG. 7B is an illustration of a seal and substantially flush glass window and trim design for partially frameless windows with a window in a down position on an automobile at cross-section C in accordance with certain embodiments of the disclosed technology.

FIG. 7B illustrates the seal and substantially flush glass window and trim design 700 for partially frameless windows on an automobile of FIG. 7A, but showing the window 701 in a fully closed position in accordance with certain embodiments of the disclosed technology. As shown, each of the first seal 710 and third seal 714 may engage with an internal surface of the window 701, whereas the second seal 712 man engage with an internal surface of the insert 712. For example, according to some embodiments, as the window 701 and insert 704 are raised they will come into contact with the seals and cause the seals to bend inwards while pressing against the internal surfaces of the window 701 and insert 704, thereby creating watertight barriers at those locations. According to some embodiments, one or more of the first seal 710, second seal 712 and third seal 714 may include an elongated body with a thin neck proximate the window assembly track 702. When engaged with the window 701 or insert 704, one or more of the first seal 710, second seal 712 and third seal 714 may bend at the thin neck causing the elongated body of the seal to press up against a surface of the window 701 or insert 704. In some embodiments, the first, second and third seals 710, 712, 714 may extend from the window assembly track 702 at an angle such that the bodies of the seals are angled in a direction that is towards the exterior trim piece 724. Thus, the angle of the seals along with the thin necks of each seal may cause each of the first, second and third seal 710, 712, 714 to bend inwards in the direction of the exterior trim piece 724 and away from the outer surface of the window 701.

According to some embodiments, the window guide 703 may have a cross-sectional shape that is shaped to guide the window 701 vertically between various open and closed positions such that an outer surface of the window 701 is flush or substantially flush with an edge of the roof of the vehicle body 205. In some embodiments, the window guide 703 may have the same cross-sectional shape at different vertical heights of the window guide 703, creating a linear vertical path for the window 701 to travel in. However, in some alternative embodiments, the window guide 703 or its cavity may have a different cross-sectional shape at different vertical heights of the window guide 703, to allow the window guide 703 to change the window's 701 distance relationship from the vehicle body 205 at the top of the window 701. In other words, in some embodiments, a shape of the cross-section of the window guide 703 may change with the height of the cross-section of the window guide 703 in a manner designed to force the window into a different lateral position (e.g., inboard towards the center of the vehicle body) as the window is raised from a first vertical position (e.g., a first closed position) to a second vertical position (e.g., a second closed position). For example, the window guide 703 may have a cross-sectional shape where an outer wall 703a of the window guide 703 moves closer towards an inner wall 703b of the window guide when going from a first height of the window guide 703 (e.g., a height at which the insert 704 is positioned within the window guide 703 such that the window is in the first closed position) to a second higher height of the window guide 703 (e.g., a height at which the insert 704 is positioned within the window guide 703 such that the window is in the second closed position) to force the insert 704 (and correspondingly the window 701) to move laterally inwards towards the interior of the vehicle as the insert moves upwards from the first height to the second height within the window guide 703. By forcing a top portion of the window 701 inwards in this fashion, the window guide 703 may allow for the window 701 to be better gripped the secondary seal at high speed, for example in an embodiment where the secondary seal does not include a lip 218 for gripping the window 701 as shown in FIG. 2A.

Thus, according to some embodiments, a framed/framing portion of a vehicle door body may include a window guide 703 configured to receive an insert 704 attached to a window 701. In some embodiments, the window guide 703 may have a consistent cross-sectional shape along its vertical height. In some embodiments, the window guide 703 may have a first cross-sectional shape at a first vertical position that gradually transforms into a second cross-sectional shape at a second vertical position such that as the insert 704 travels vertically within the window guide 703 (e.g., in response to an instruction to move the window from a first closed position to a second closed position), the window guide 703 is configured to move the window 701 from a first lateral position when the window is in the first closed position to a second lateral position when the window is in the second closed position. Further, in some embodiments, the vehicle door may include a window guide 703 configured to reposition a top edge of a window 701 inwards by a predetermined distance such that when the window 701 is in the second closed position, the pillow of the secondary seal closes the predetermined distance to form a lip around an outer surface of the window to secure the window laterally and prevent it from buffeting at high speeds.

Figure 8:
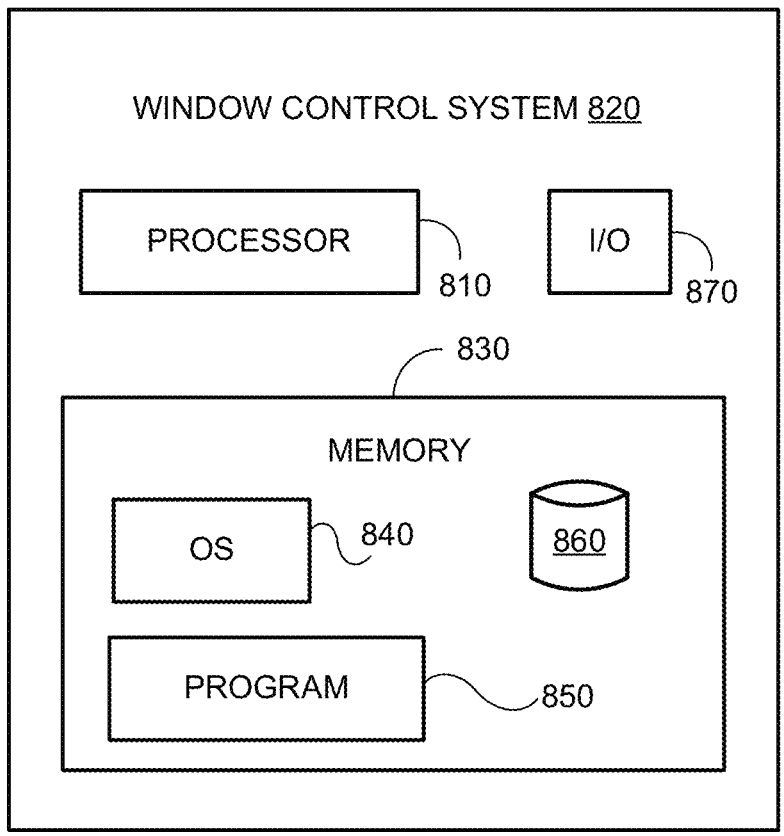
FIG. 8 is block diagram of an example window control system used to control window motor operation, according to an example implementation of the disclosed technology.

FIG. 8 is a block diagram of an example window control system 820 used to manipulate and change window position according to an example implementation of the disclosed technology. As shown, the window control system 820 may be a window control unit and may include a processor 810, an input/output (I/O) device 870, a memory 830 containing an operating system (OS) 840 and a program 850. In certain example implementations, the window control system 320 may be a single computer system or may be configured as a distributed computer system including multiple computers that interoperate to perform one or more of the processes and functionalities associated with the disclosed embodiments. In some embodiments, the window control system 820 may further include a peripheral interface, a transceiver, a mobile network interface in communication with the processor 810, a bus configured to facilitate communication between the various components of the window control system 820, and a power source configured to power one or more components of the window control system 820.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, a CAN-BUS port, another like communication interface, or any combination thereof.

A mobile network interface may provide access to a cellular network, the Internet, or another wide-area or local area network. In some embodiments, a mobile network interface, such as a CAN-BUS network, may include hardware, firmware, and/or software that allow(s) the processor (s) 810 to communicate with other devices via wired or wireless networks, whether local or wide area, private or public, as known in the art. A power source may be configured to provide an appropriate alternating current (AC) or direct current (DC) to power components.

The processor 810 may include one or more of a microprocessor, microcontroller, digital signal processor, co-processor or the like or combinations thereof capable of executing stored instructions and operating upon stored data. The memory 830 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a widget or gadget engine, and/or other applications, as necessary), executable instructions and data. In one embodiment, the processing techniques described herein may be implemented as a combination of executable instructions and data stored within the memory 330.

The processor 810 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 810 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 810 may be a single core processor that is configured with virtual processing technologies. In certain embodiments, the processor 810 may use logical processors to simultaneously execute and control multiple processes. The processor 810 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the window control system 820 may include one or more storage devices configured to store information used by the processor 810 (or other components) to perform certain functions related to the disclosed embodiments. In one example, the window control system 820 may include the memory 830 that includes instructions to enable the processor 810 to execute one or more applications, such, network communication processes, and any other type of application or software known to be available on computer systems. Alternatively, the instructions, application programs, etc. may be available from a memory over a network. The one or more storage devices may be a volatile or non-volatile, magnetic, semiconductor, tape, optical, removable, non-removable, or other type of storage device or tangible computer-readable medium.

The window control system 820 may include a memory 830 that includes instructions that, when executed by the processor 810, perform one or more processes consistent with the functionalities disclosed herein. Methods, systems, and articles of manufacture consistent with disclosed embodiments are not limited to separate programs or computers configured to perform dedicated tasks. For example, the window control system 820 may include the memory 830 that may include one or more programs 850 to perform one or more functions of the disclosed embodiments. The processor 810 may execute one or more programs 850 located remotely from the window control system 820. For example, the window control system 820 may access one or more remote programs that, when executed, perform functions related to disclosed embodiments.

The memory 830 may include one or more memory devices that store data and instructions used to perform one or more features of the disclosed embodiments. The memory 830 may include software components that, when executed by the processor 810, perform one or more processes consistent with the disclosed embodiments. In some embodiments, the memory 830 may include a window control system database 860 for storing related data to enable the window control system 820 to perform one or more of the processes and functionalities associated with the disclosed embodiments. The window control system database 860 may include stored data relating to status data and historical status data.

The window control system 820 may also include one or more I/O devices 870 that may comprise one or more interfaces for receiving signals or input from devices and providing signals or output to one or more devices that allow data to be received and/or transmitted by the window control system 820. For example, the window control system 820 may include interface components, which may provide interfaces to one or more input devices, such as one or more keyboards, mouse devices, touch screens, track pads, trackballs, scroll wheels, digital cameras, microphones, sensors, and the like.

In examples of the disclosed technology, the window control system 820 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the window control system 820 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the window control system 820 may include a greater or lesser number of components than those illustrated.

According to some embodiments, the window control system 820 may interface with other devices, memory and/or computing systems of a vehicle. For example, in some embodiments, the window control system 820 may be configured receive speed or velocity data obtained from a speedometer of the vehicle, wheel speed sensors, an engine or motor rotational speed sensor, transmission output shaft sensor, or any other such sensor capable of measuring or determining the present speed of the vehicle. In some embodiments, the window control system 820 may be configured to receive location data, such as GPS data from a GPS system operating aboard the vehicle. In some embodiments, the GPS system may provide a speed or velocity of the vehicle to the window control system 820 or the window control system 820 may be configured to determine or calculate a speed or velocity of the vehicle based on location data provided by the GPS system. The window control system 820 may be configured to compare a received or calculated speed/velocity of the vehicle to a stored predetermined speed threshold to determine when the vehicle has exceeded the predetermined speed threshold and when the speed of the vehicle has dropped below the predetermined speed threshold.

According to some embodiments, the window control system 820 may store instructions that when executed, cause one or more window motors to raise a window into a first closed position, as shown in FIG. 2B. The instructions may be executed in response to, for example, a user pressing a button in the vehicle designed to close a particular window that is presently open or partially open. In some embodiments, the instructions may be executed automatically in response to one or more predetermined actions, such as for example, one or more sensors of the vehicle determining that the vehicle is experiencing rain when the window is in an open or partially open position.

Further, in some embodiments, the window control system 820 may store instructions that when executed, cause one or more window motors to raise a window from the first closed position into a second closed position, as shown in FIG. 2C. In some embodiments, the window control system 820 may be configured to automatically execute instructions to raise one or more vehicle door windows from the first closed position to the second closed position in response to determining that a speed of the vehicle has exceeded a predetermined speed threshold. For example, the predetermined speed threshold may be 50 mph such that in response to the vehicle accelerating from 49 mph to 51 mph, the window control system 820 may automatically cause one or more of the vehicle door windows to raise from the first closed position to the second closed position. While the previous example lists 50 mph as the predetermined speed threshold, it should be understood that any speed may be used, such as for example 25mph, 30 mph, 35 mph, 40 mph, 45 mph, 50 mph, 55 mph, 60 mph or any other suitable speed as may be determined based on the design characteristics of the vehicle. Automatically causing the window to move from the first closed position to the second closed position may include transmitting instructions by one or more processors to one or more window motors (e.g., via window motor controllers, or a body control unit) to cause the one or more window motors to raise a window position from a first height at the first closed position to a second height at the second closed position, where the second height is higher than the first height (e.g., by 3 mm).

In some embodiments, the window control system 820 may be configured to raise each vehicle window that is in the first closed position to be in the second closed position in response to the vehicle exceeding the predetermined speed threshold. Thus, for example, in a case where all of the vehicle windows are in the first closed position then the window control system 820 will cause all of the vehicle windows to raise to the second closed position upon the vehicle exceeding the predetermined speed threshold. However, if, for example, both front door windows are in the first closed position while both rear door windows are in an open or partially open position, then the window control system 820 will automatically cause the front door windows to raise to the second closed position in response to the vehicle exceeding the predetermined speed threshold while leaving the rear door windows in their presently open positions. Further, if one or more vehicle door windows are in the second closed position and the vehicle speed drops below the predetermined speed threshold, the window control system 820 may be configured to automatically cause the one or more vehicle door windows that are in the second closed position to lower back into the first closed position as shown in FIG. 2B.

Figure 9A:
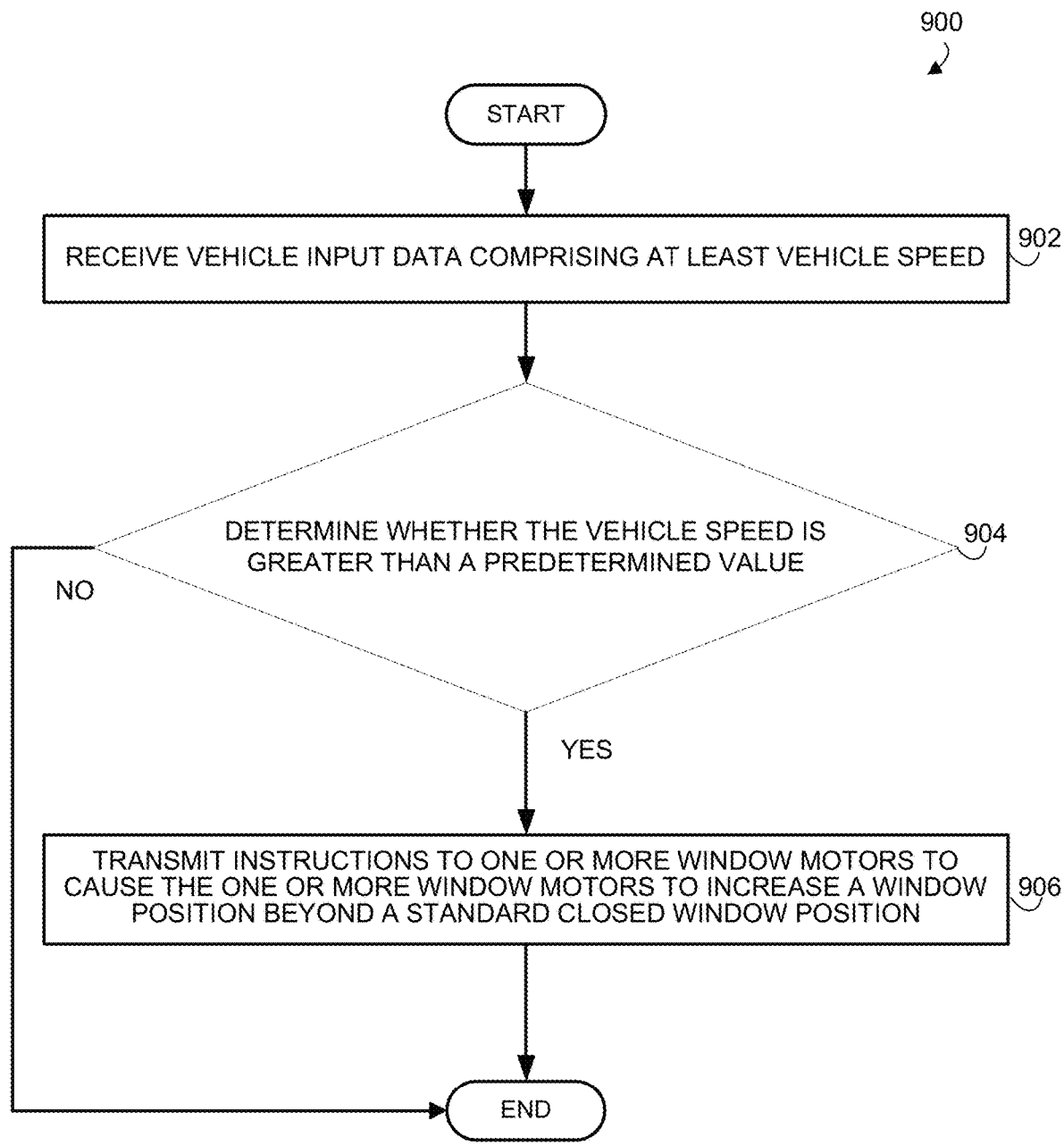
FIGS. 9A and 9B are flow diagrams illustrating an exemplary method for actuating the window motors using the window control system, according to an example implementation of the disclosed technology.
Figure 9B:
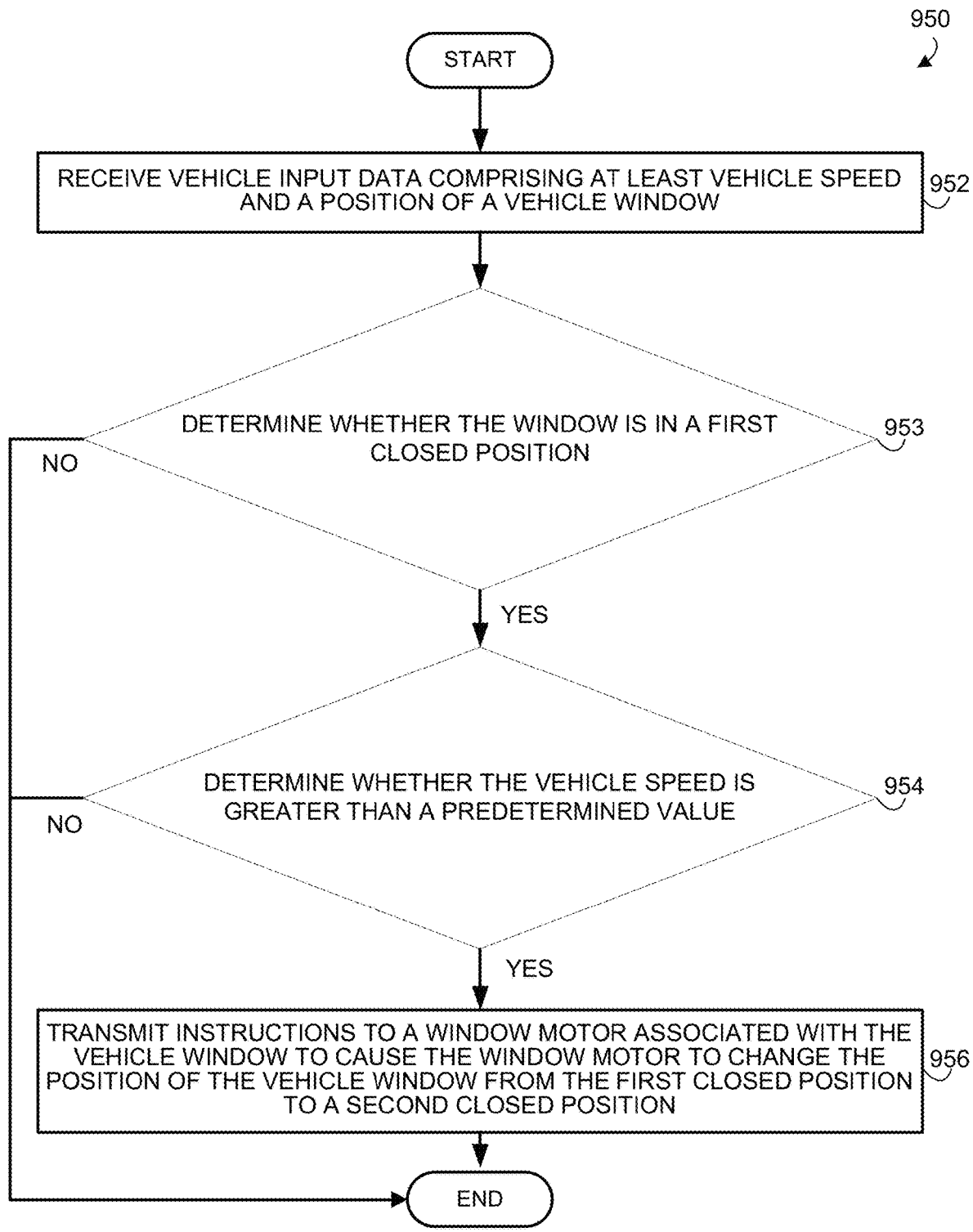

FIGS. 9A and 9B illustrate example methods of a window system utilizing the aforementioned sealing methods as described with reference to FIGS. 2A-7B. FIG. 9A is a flow diagram illustrating an exemplary method 900 of a window system, in accordance with certain embodiments of the disclosed technology. The steps of method 900 may be performed by one or more components of the window system (e.g., window control system 820 in conjunction with physical parts such as a window motor and window with the above seals), as described in more detail with respect to FIGS. 2A-7B. In some embodiments, the process described in FIGS. 9A and 9B may be iterative and may be constantly repeated as the vehicle is on, in a forward gear, or moving.

As shown in FIG. 9A, the window system may receive 902 input data regarding the vehicle. The vehicle data may comprise vehicle speed information, vehicle acceleration information, vehicle deceleration information, and vehicle g-force information. The vehicle data may be communicated to the window system via a CAN-bus or other automotive bus system. The vehicle data may be from an engine control unit, battery control unit, body control unit, or another electronic control unit part of a vehicle control structure. The vehicle speed may, in some embodiments, be received directly from speed information from wheel speed sensors, axle speed sensors, transmission speed sensors, or engine/motor speed sensors.

As further shown in FIG. 9A, the window system may determine 904 whether the vehicle speed is greater than a predetermined value. The predetermined value may be a fixed speed. The fixed speed may be programmed into the window system and may be determined by the aerodynamics of the vehicle, such as a speed above which buffeting of the window occurs (e.g., 45 miles per hour). The predetermined value may be a variable speed based on data or characteristics of the vehicle (e.g., if the vehicle is rapidly accelerating, the predetermined value may be lower than if the vehicle is slowly accelerating or staying constant). If the system determines the vehicle speed is greater than the predetermined value, the system proceeds to block 906. If the system determines the vehicle speed is not greater than the predetermined value, the system ends the process.

As further shown in FIG. 9A, the window system may transmit 906 instructions to one or more window motors to cause the one or more window motors to increase the window position beyond a standard closed window position. As described with reference to FIGS. 2B and 2C, the window may be in one of two closed positions. The first (lower) closed position, where the pillow of the secondary seal is uncompressed, may be used at lower speeds. The second (higher) closed position, where the pillow of the secondary seal is compressed, thereby holding the window against the body of the vehicle, may be used at higher speeds. Therefore, when the higher speed is detected (or the vehicle is quickly approaching a higher speed via quick acceleration), the system may automatically increase the position of the window to the secondary closed (higher position). Thus, in response to determining that the vehicle speed is greater than the predetermined value, the window system may transmit instructions to one or more window motors to raise a window position of a window from a first closed position to a second closed position. To cause the window to move to the second closed position, the system may transmit instructions or a signal to a window motor to increase/raise the position of the window. The window motor may be operably connected to the window using a window regulator. The system may energize the window motor by communicating with the window motor over a CAN-bus network. Alternatively, the system may energize the window motor by supplying power to the window motor using a relay. According to some embodiments, the instructions may be sent to one or more window motors associated with each vehicle door window that is in the first closed position at the time of determining that the vehicle speed is greater than the predetermined value. In other words, if one or more windows are in an open or partially open position, the window system will not transmit instructions to window motors associated with those windows but will instead take no action, causing those windows to remain in their opened state.

According to some embodiments, transmitting instructions to the one or more window motors to raise the window position of the window from the first closed position to the second closed position may cause an insert attached to the window to travel upwards within a window guide of a vehicle door. As described previously above, a window guide may include a hollow cavity having a shape that forces a top portion of the window from a first lateral position inwards to a second lateral position such that there is a gap of a predetermined size between the top portion of the window and a surface of the vehicle or axis of the vehicle surface. When the window is in the first closed position, a first seal of the vehicle body may form a watertight barrier between the vehicle body and the window. When the window is in the second closed position, a second seal of the vehicle body may form a lip around the top portion of the window by filling the gap to secure the window in place.

In some embodiments, the window system may use one or more position sensors to determine the position of the window prior to or after the determination in block 904 or after transmitting the instructions to the window motor in block 906. The window system may also perform a reverse action to blocks 904 and 906 and, after raising the window to the second position, may determine if the vehicle speed lowers below the predetermined value, and if so, automatically lower the window position to the first closed position. Thus, in some embodiments, in response to determining that the vehicle speed has been reduced from being greater than the predetermined value to being less than or equal to the predetermined value, the window system may transmit instructions to the one or more window motors to lower the window position of the window from the second closed position to the first closed position. Furthermore, in some embodiments, in response to determining that an open window is being closed (e.g., in response to a user pressing a button to close the window) while the vehicle is traveling at a speed the exceeds the predetermined value, the window system may transmit instructions to one or more window motors associated with that window to automatically cause that window to be raised to the second closed position.

In some embodiments, the window system may have certain timeout limitations so that the window is not constantly moving up and down between the first and second closed positions if the vehicle is travelling around the predetermined value speed. For example, in some embodiments, once a window has been raised in to the second closed position, the window system may be configured to keep the window in the second closed position for a minimum amount of time (e.g., 5 minutes) before allowing the window to be lowered back to the first closed position. However, in some embodiments, this minimum amount of time may be overridden in response to a triggering event occurring, such as for example, the vehicle being placed in park or the vehicle engine being shut off. Furthermore, the window system may be able to transmit instructions to the window motor to move the window in different fashions depending on the vehicle data. For example, if the vehicle is accelerating slowly or driving normally, the instructions may direct the window motor to move the window to the second closed position so that the movement is imperceptible to the driver. Alternatively, if the vehicle is accelerating quickly, the instructions may direct the window motor to move the window to the second closed position quickly to prevent buffeting from occurring if the vehicle is determined to quickly go past the predetermined value. The window system may have programmable modes that may be programmed by the manufacturer or chosen by the driver using an infotainment system.

FIG. 9B is a flow diagram illustrating an exemplary method 950 for a window system, in accordance with certain embodiments of the disclosed technology. The steps of method 950 may be performed by one or more components of the aforementioned window system (e.g., window control system 820 in conjunction with physical parts such as a window motor and window with the above seals), as described in more detail with respect to FIGS. 2A-7B.

Method 950 of FIG. 9B is similar to method 900 of FIG. 9A. The descriptions of blocks 952, 954, and 956 in method 950 are similar to the respective descriptions of blocks 902, 904, and 906 of method 900 and are not repeated herein for brevity. Additional block 953 is described below.

As shown in FIG. 4B, the window system may determine 953 if the window is in a closed position. This may require using one or more position sensors or the position of the window motor operably connected to the window in order to determine if the window is open or closed. If the window is open, or down, as selected by the driver, the window system may not operate. If the window is closed, the method proceeds to block 954. This may prevent the window system from closing the window if the driver has selected for the window to be open. In some embodiments, method 950 may also be used to perform the reverse action (e.g., to determine if the window is in a second closed position and the vehicle speed is less than a predetermined value, and, if so, transmit instructions to move the vehicle window to a first closed position). This may be completed to move the window to the lower position when the vehicle speed is reduced below a threshold value.

Figure 10B:
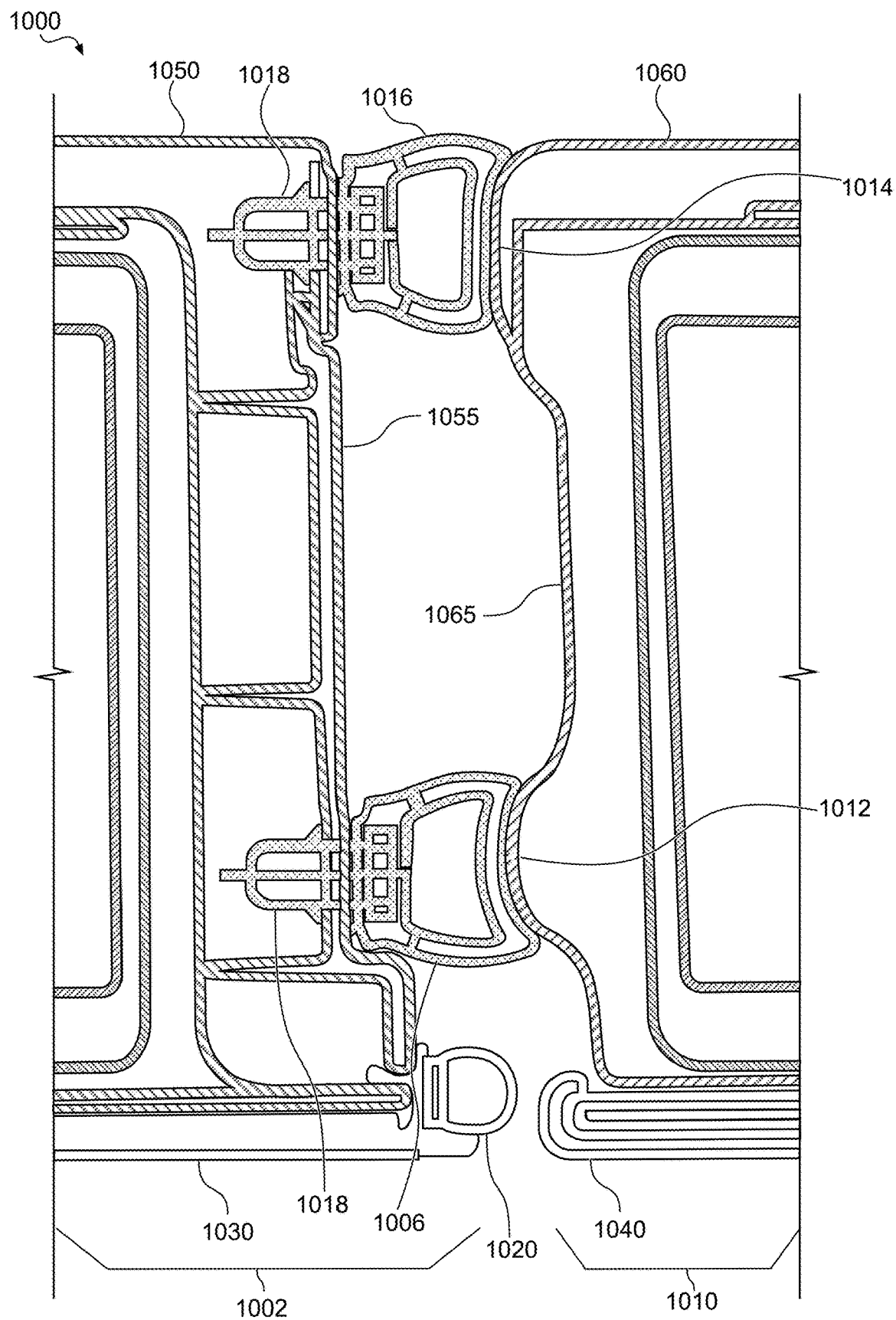
FIG. 10B is an illustration of an enlarged view of seal and door structure for side barn doors on an automobile at cross-section C in accordance with certain embodiments of the disclosed technology.

FIG. 10A is an illustration of a seal and door structure 1000 for side barn doors on an automobile at cross-section C of FIG. 1 and FIG. 10B is an enlarged illustration of a portion of the seal and door structure 1000, in accordance with certain embodiments of the disclosed technology. FIG. 10A depicts portions of a front door 1002 (including a portion of a front window 1036 attached to window guide 1034) and rear door 1010 corresponding to the framing portions of the doors that extend from the bottom of the doors to the roof of the vehicle as shown in FIG. 1 at the quasi-B-pillar 120. The seal and door structure 1000 disclosed herein is different from designs using B-pillars which rely on latching, hinging, and sealing to the B-pillar. Prior door systems with B-pillarless designs adopted a number of disadvantageous features. For example, in some designs, the front door overlapped the rear door, therefore requiring the front door to be opened prior to the rear door. Other designs required the rear door to latch to the front door, thereby preventing the rear door from being opened independently. In the embodiment presented in FIGS. 10A and 10B, both the front door 1002 and rear door 1010 are able to be opened individually because the rigid (e.g., metal portions) of the door do not conflict with each other when the door is opened or closed. In order to retain structural rigidly while maintaining a B-pillarless design for the body, the B-pillar structure may be distributed within the doors, while maintaining the 'barn-door' design. The doors may be made of multiple complementary parts, including an outer portion 1001 that may have one or more outer structures or structural elements and an inner portion 1003 that may have one or more inner structures or structural elements. One or more structures of the inner portion 1003 may be spot welded to one or more outer structures of the outer portion 1001. According to some embodiments, the inner portion 1003 may include one or more of a first structural member 1035, a second structural member 1037 and a third structural member 1038. The first, second, and/or third structural members 1035, 1037, 1038 may be made of steel, stamped aluminum or another load-bearing material that is strong enough to be used in providing the structural support of a B-pillar. In some embodiments, the inner portion 1003 may provide structural support that forms a quasi-B-pillar when the front door 1002 and rear door 1010 are closed together and securely latched to the vehicle body. The outer portion 1001 may provide structure of exterior surfaces of a door, such as the vehicle interior-facing face 1050, the vehicle exterior-facing face 1052 (i.e., front trim piece 1030 which may correspond to exterior trim piece 724 shown in FIG. 7A) and the rear door-facing face 1055 of the front door 1002. Similarly, the outer portion of the rear door 1010 may include the vehicle interior-facing face 1060, the vehicle exterior facing face 1062 and the front door-facing face of the rear door 1010. According to some embodiments, the rear door-facing face 1055 of front door 1002 may be spot-welded to the vehicle interior-facing face 1050 of the front door 1002 and the vehicle exterior-facing face 1052 of the front door 1002. Similarly, the front door-facing face 1065 of rear door 1010 may be spot-welded to the vehicle interior-facing face 1060 of rear door 1010 and the vehicle exterior-facing face 1062 of rear door 1010. The outer portion 1001 of the front door 1002 may be configured to provide one or more seals on the rear door-facing face of the front door 1002, while the front door-facing face 1065 of the rear door 1010 may be configured to provide one or more rigid sealing surfaces designed to contact and/or engage the one or more seals of the front door 1002 when both doors are closed to provide one or more watertight seals between the front door 1002 and rear door 1010. The sealing surfaces may be rigid and/or inflexible surfaces comprised of, for example metal or plastic. The one or more watertight seals may extend vertically along the entire height of the doors. This design allows the doors to seal while avoiding the need for a B-pillar and while also maintaining fully independent a 'barn-door' design where either the front or rear door can be opened independently.

As shown in FIGS. 10A and 10B, an outer seal 1006 and an inner seal 1016 may extend from the rear door-facing face of the front 1002 in the direction of the front door-facing face of the rear door 1010. According to some embodiments, each of the outer seal 1006 and the inner seal 1016 may be attached to the rear door facing face 1055 of the front door 1002 by a retaining shape 1018. The retaining shape 1018 may be configured to extend through a through-hole of the rear door-facing face 1055 of the front door 1002 and anchor or otherwise secure the seal to the inner wall of the rear door-facing face 1055 of the front door 1002. Each retaining shape 1018 may be of integral construction with the outer seal 1006 or the inner seal 1016. Thus, in some embodiments the outer and inner seals 1006, 1016 may be clipped or anchored into the structure of the front door 1002. According to some embodiments, the rear door-facing face 1055 of the front door 1002 may include a first plurality of vertically aligned through-holes aligned with the outer seal 1006 and a second plurality of vertically aligned through-holes aligned with the inner seal 1016 and both the outer and inner seals 1006, 1016 may each include a plurality of retaining shapes 1018, such that each of the plurality of retaining shapes 1018 extends through one of the vertically aligned through-holes to secure that portion of the seal to the rear door-facing face 1055 of the front door 1002. In this manner, each of the outer seal 1006 and inner seal 1016 may continuously extend across the vertical length of the rear door-facing face 1055 of the front door 1002 (e.g., from the bottom of the door to the top of the door) to provide a watertight seal across the entire vertical length of the doors when closed. Further, in some embodiments, one or more of the outer seal 1006 and/or inner seal 1016 may connect to one or more other door seals, such as for example, a door seal that may run across the bottom of the front door 1002 and up the opposing side of the door (i.e., the side of the front door 1002 that is hinged) and/or a seal that extends around an inner surface of one or more edges of the front door 1002. The rear door 1010 may also include one or more seals, such as a door seal that may run across the bottom of the rear door 1010 and up the opposing side of the door (i.e., the side of the rear door 1010 that is hinged) and/or a seal that extends around an inner surface of one or more edges of the rear door 1010. Thus, in alternative embodiments in which the outer seal 1006 and inner seal 1016 are attached to the front door-facing face 1065 of the rear door 1010 instead of the rear door-facing face 1055 of the front door 1002, one or more of the outer seal 1006 and inner seal 1016 may connect to one or more of these other door seals on the rear door 1010.

In some embodiments, one or more of the outer seal 1006 and inner seal 1016 may have a bulb or rounded (e.g., approximately circular) cross-sectional shape that is designed to compress when a force is exerted upon the seal by the first sealing surface 1012 and/or second sealing surface 1014 of the rear door 1010, respectively, as shown in FIGS. 10A and 10B. One or more of the outer seal 1006 and inner seal 1016 may be made of rubber or other similar firm but compressible material. One or more of the outer seal 1006 and inner seal 1016 may include one or more hollow cavities that allow for compression of the seal when force is applied to an external surface of the seal. The inner seal 1016 may be positioned on the rear door-facing face 1055 of the front door 1002 at a location that is near to the vehicle interior-facing face 1050 of the front door 1002. For example, in some embodiments, the inner seal 1016 may be positioned approximately where the vehicle interior-facing face 1050 of the front door 1002 meets with the rear door-facing face 1055 of the front door 1050, or slightly inset from that location by a predetermined distance. Conversely, the outer seal 1006 may be positioned on the rear door-facing face 1055 of the front door 1002 at a location that is near to the vehicle exterior-facing face 1052 of the front door 1002. For example, as shown in FIGS. 10A and 10B, the inner seal 1016 may be positioned at a location that is slightly inset from where the vehicle exterior-facing face 1052 of the front door 1002 meets with the rear door-facing face 1055 of the front door 1050 to accommodate the positioning of an anti-pinch switch 1020 behind the front trim piece 1030. As previously described, due to the design and assembly of the door structures, the front trim piece 1030 is thin, allowing the anti-pinch switch 1020 to be positioned more closely to the exterior surface of the vehicle than is conventionally possible, allowing for faster and easier detection of objects between the front and rear doors 1002, 1010 when closing.

According to some embodiments, the front door-facing face 1065 of the rear door 1010 may include a first sealing surface 1012 that is configured to receive the outer seal 1006, such as a first protrusion (e.g., a rounded hump) extending from the surface of the front door-facing face 1065 of the rear door 1010 that is positioned to press against the outer seal 1006 when both doors 1002, 1010 are closed and a second sealing surface 1014 configured to receive the inner seal 1016, such as a second protrusion (e.g., a rounded hump) extending from the surface of the front door-facing face 1065 of the rear door 1010 that is positioned to press against the inner seal 1016 when both doors 1002, 1010 are closed, as shown in FIGS. 10A and 10B. Alternatively, in some embodiments, both the first sealing surface 1012 and second sealing surface 1014 may be flat and part of a continuous flat surface of the front door-facing face 1065 of the rear door 1010. According to some embodiments, when both the front door 1002 and rear door 1010 are closed, the first and second sealing surfaces 1012, 1014 will press against the outer and inner seals 1006, 1016, causing the seals to compress and form a watertight barrier between the doors.

Figure 10C:
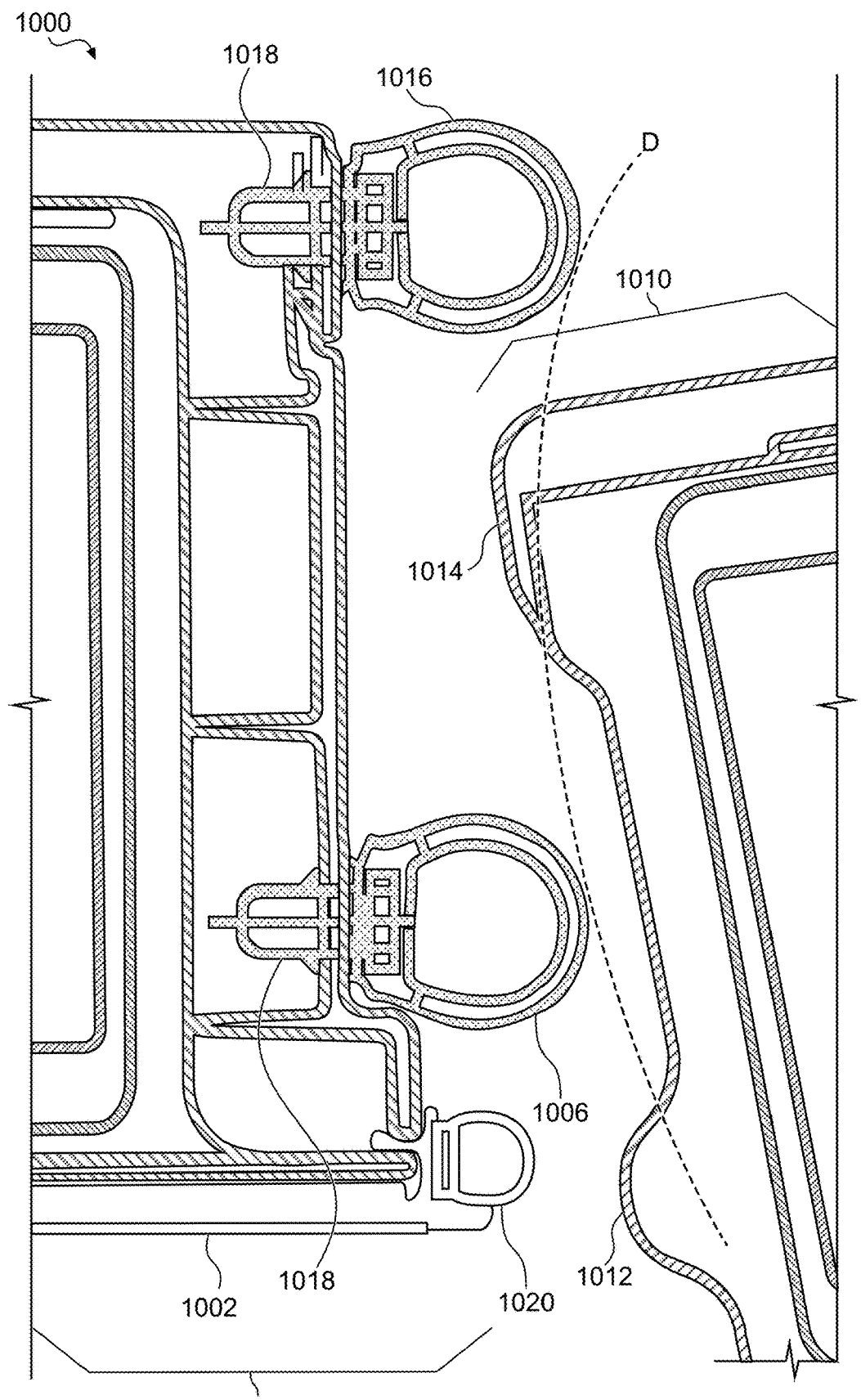
FIG. 10C is an illustration of an enlarged view of a seal and door structure for side barn doors on an automobile at cross-section C depicting the rear door opening, in accordance with certain embodiments of the disclosed technology.
Figure 10D:
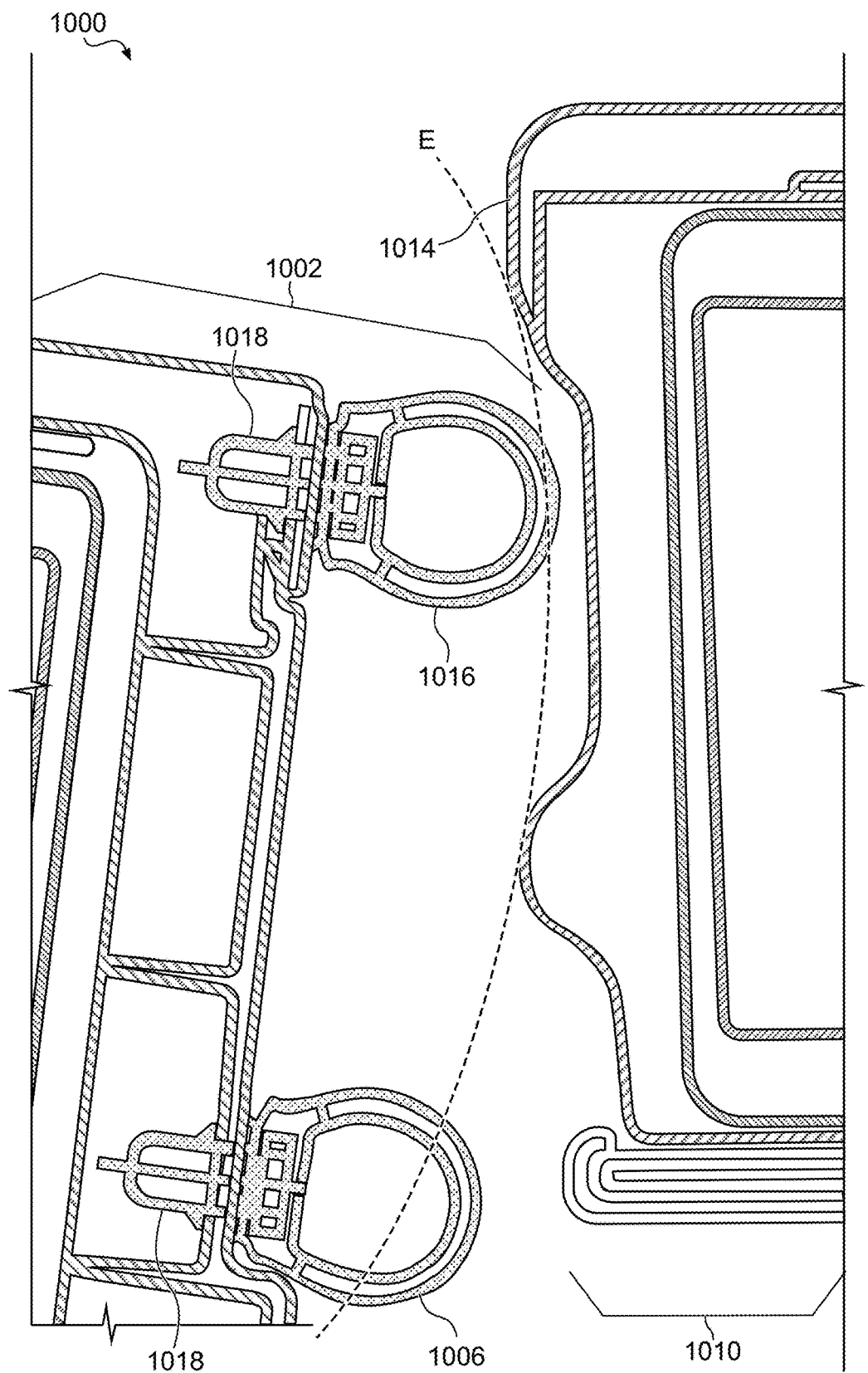
FIG. 10D is an illustration of an enlarged view of seal and door structure for side barn doors on an automobile at cross-section C depicting the front door opening, in accordance with certain embodiments of the disclosed technology.

FIG. 10C shows the seal and door structure 1000 of FIG. 10B with the rear door 1010 in the process of being opened along swingline D while the front door 1002 remains closed and conversely FIG. 10D shows the front door 1002 in the process of being opened along swingline E while the rear door 1010 remains closed. According to some embodiments, the shapes, sizes and or designs of the second sealing surface 1014 and/or outer seal 1006 may be such that when the rear door 1010 opens the second sealing surface 1014 may pass by the outer seal 1006 without coming into contact with it, avoiding additional friction when opening the rear door 1010. Alternatively, in some embodiments, a portion of second sealing surface 1014 may contact a portion of the outer seal 1006 when the rear door 1010 opens, but due to the design and material of the outer seal 1006 this contact may provide minimal friction. Similarly, in some embodiments, the shapes, sizes and/or designs of the inner seal 1016 and/or first sealing surface 1012 may be such that when the front door 1002 opens the inner seal 1016 may pass by the first sealing surface 1012 without coming into contact with it, avoiding additional friction when opening the front door 1002. Alternatively, in some embodiments, a portion of inner seal 1016 may contact a portion of the first sealing surface 1012 when the front door 1002 opens, but due to the design and material of the inner seal 1016 this contact may provide minimal friction. According to some embodiments, the one or more of the seals 1006, 1016 and sealing surfaces 1012, 1014 may be treated with a coating to remove or reduce friction. In some embodiments, the seals may be treated with a functional coating. In some embodiments, the coating may be an extruded coating, which may be thicker than other coatings. For example, in some embodiments, the coating may be extruded with the rubber material of one or more of the outer and inner seals 1006, 1016, creating a thicker layer than if the coating were to be sprayed. In some embodiments, the rubber material of the seals may be an ethylene propylene diene terpolymer (EPDM), which is an extremely durable synthetic rubber and the coating used may be any suitable coating that may be extruded with the rubber seals (e.g., Recasil® 524). In some embodiments, the coating may have a thickness of approximately 0.1 mm.

According to some embodiments, because the seals 1006, 1016 may cause some amount of friction when opening or closing each door, the vehicle may be equipped with a soft-close door system. This may allow the user to press a button for the system to pop the front or rear door slightly ajar for the user to gain access using an electrically controlled button. Similarly, when the user closes the door, a soft-close door system may be used to completely shut the door (and completely tighten the seals) by pulling the door to a fully closed position. Both the front door 1002 and rear door 1010 may be equipped with locks and/or latches. The locks and laches may be at the top and/or bottom of each door and may fasten the top and/or bottom of each door to the body of the vehicle at the roof and/or the floor of the vehicle, by for example, latching onto one or more latch strikers 302, 304, 312, 314 as shown in FIG. 3 when the doors are closed.

Although FIGS. 10A-10D and the accompanying description disclose a structure involving two seals on the rear door-facing face 1055 of the front door 1002 having seals of a bulb-like or rounded (e.g., approximately circular) cross-sectional shape, it is contemplated that other configurations and shapes of seals may be utilized in other embodiments. For example, in some embodiments the two seals may instead be positioned on the front door-facing face of the rear door 1010. In some embodiments, the outer seal 1006 may be positioned on the rear door-facing face 1055 of the front door 1002 and the inner seal 1016 may be positioned on the front door-facing face of the rear door 1010, or vice versa. Further, in some embodiments one or both of the outer seal 1006 and inner seal 1016 may be formed as a delta (Δ) shape or some other shape. In some embodiments, one or more of the rear door-facing face of the front door 1002 or front door-facing face 1065 of the rear door 1010 may include one or more cavities or indentations that accommodate one or more of the outer and inner seals 1006, 1016 or other structures such as a lip designed to engage a seal on an opposing door.

For example, in some embodiments a vehicle of the present disclosure may include a front door 1002 hinged at the front of the vehicle that has an outer cavity accommodating the outer seal (i.e., a first seal) and a rear door 510 hinged at the rear of the vehicle that has a lip accommodating an inner seal (i.e., a second seal). The front and rear doors 1002, 1010 may be capable of independently opening and closing in a barn-door fashion. In other words, when both the front door 1002 and rear door 1010 are in a closed a position, a user may independently open and shut the front door 1002 and/or independently open and shut the rear door 1010 without regard to the other door. The outer seal and inner seal may operate to create a watertight barrier between the rear edge/face of the front door 1002 and the front edge/face of the rear door 1010 when the front door 1002 and rear door 1010 are in a closed position.

According to some embodiments, the outer cavity may be an indentation in the rear door-facing face 1055 of the front door 1002 proximate to the vehicle exterior-facing face 1052 of the front door 1002. The outer seal may be attached to a surface of the outer cavity. The outer seal may extend outwards such that a first portion of the outer seal (e.g., a tip of the outer seal) compresses against the front door-facing face 1065 of the rear door 1010 when the front door 1002 and rear door 1010 are in a closed position. In some embodiments, the outer seal may be made of a rubber material formed in a roughly triangular or delta shape such that the first portion of the outer seal includes a tip of the roughly triangular shape that is configured to alternatively bend towards an exterior of the vehicle and bend towards an interior of the vehicle in response to opening and closing either the front door 502 or rear door 1010. According to some embodiments, both the outer seal and inner seal may be each made of a respective material and have a respective shape that cause the seal to exert sufficient outward pressure to create a watertight seal between the front door 1002 and the rear door 1012 when the front door 1002 and rear door 1012 are in a closed position, while also providing sufficient flexibility to allow each of the front door 1002 and the rear door 1012 to be opened independently of one another.

In some embodiments, a lip of the rear door 1010 may be disposed proximate to an intersection of the vehicle interior-facing face 1060 of the rear door 510 and the front door-facing face 1065 of the rear door 510. According to some embodiments, an inner seal may include an internal rigid member that is configured to secure the inner seal around the lip. For example, the internal rigid member may be a U-shaped piece of metal formed to secure the inner seal around the lip. In some embodiments, the inner seal may have a shape and positioning such that it extends from the front-door facing face 1065 of the rear door 1010 towards the rear door-facing face 1055 of the front door 1002 such that when the front door 1002 and the rear door 1010 are in a closed position the inner seal compresses against a sealing surface of the front door 502. In some embodiments, the sealing surface may be a flat surface that is angled inwards from the rear door-facing surface 1055 of the front door 1002 to the vehicle interior-facing surface 1050 of the front door 1002. In some embodiments, the sealing surface may be a rounded surface at the intersection of the interior-facing face 1050 of the front door 1002 and the rear door-facing face 1055 of the front door 1002.

Although FIGS. 10A-10D depict cross-sections of the seal and door structure 1000, it will be understood that the outer seal 1006 and inner seal 1016 shown in FIGS. 10A-10D extend vertically along the entire length of the inner surfaces of the front door 1002 and rear door 1010, respectively, so that when both doors are closed the outer seal 1006 and inner seal 1016 create a continuous watertight barrier between the vertical length of the doors 1002, 1010. As will be understood by those of skill in the art, the front and rear trim pieces 1030, 1040 shown in FIG. 10A may be affixed to a portion of the body of the door that is vertically aligned with the window to provide pleasing aesthetics to the vehicle. However, in some embodiments, the door body may not include a trim piece at this portion of the door and may instead include an extension of the lower body of the door such that the external surface of the door body extends to from the bottom of the door to the top of the door in one contiguous surface. According to some embodiments, the front door 1002 and rear door 1010 may each include one or more of a first structural member 1035, a second structural member 1037 and a third structural member 1038. According to some embodiments, the first structural member 1035, the second structural member 1037 and third structural member 1038 of each of the front door 1002 and rear door 1010 may extend vertically along the entire vertical length of each door to provide structural support for the door. When the front door 1002 and rear door 1010 are both in a closed position, the structural support of provided by one or more of the first structural member 1035, the second structural member 1037 and third structural member 1038 of each door may collectively provide structural support for the vehicle as part of a quasi-B-pillar (e.g., quasi-B-pillar 120 shown in FIG. 1) formed by the collective structures of the doors when closed.

According to some embodiments, a vehicle of the present disclosure may include a soft-close door system that is configured to provide a mechanical assist in initially opening one or more of the front door 1002 and/or the rear door 1010 and completing the closing of the one or more of the front door 1002 and/or the rear door 1010. As will be understood by those of ordinary skill in the art, a soft-close door system may include one or more door motors that activate to firmly pull the door closed in response to detecting (e.g., via one or more door sensors) that the door has been closed by a predetermined amount. In other words, before a user completes the closing of a vehicle door, the soft-close door system may activate and take over the closing process to fully secure the door in a closed position. The soft-close door system may prevent slamming a door closed and may also ensure that a door is fully closed, thereby preventing the door from inadvertently being quasi-closed in a position that is not fully secured in place (e.g., by not being closed far enough to securely latch in place). According to some embodiments, a soft-close door system may also provide a mechanical assistance in opening a door by, for example, activating one or more door motors to push the door open in response to a user engaging a door handle of the door to open the door. The vehicle may further include an anti-pinch switch (e.g., anti-pinch switch 1020) positioned on an internal surface of an exterior trim piece (e.g., exterior trim piece 724). The anti-pinch switch may be positioned proximate the external surface of the front door 1002. Alternatively, in some embodiments, the anti-pinch switch may be positioned proximate the external surface of the rear door 1010.

In some embodiments, the front door 1002 may include a frame structure proximate the rear door-facing face of the front door 1002 that extends from a bottom of the front door 1002 to a top of the front door 1002 (e.g., a portion of the body of front door 102 extending from the rear edge 108 to a vertical axis defined by the second framing portion 106 shown in FIG. 1). Similarly, the rear door 1010 may also include a frame structure that is proximate the front door-facing face of the rear door 1010 that extends from a bottom of the rear door 1010 to a top of the rear door 1010 (e.g., a portion of the body of rear door 112 extending from the front edge 118 to a vertical axis defined by the second framing portion of the rear door 112 as shown in FIG. 1). When the front door 1002 and rear door 1010 are both in a closed position, the frame structure of the front door 1002 and the frame structure of the rear door 1010 may form a quasi-B-pillar (e.g., quasi-B-pillar 120 shown in FIG. 1) that provides structural support in a manner similar to a conventional B-pillar that is built into the vehicle body.

In some embodiments, a vehicle having the seal and door structure 1000 may include one or more latches, latching mechanisms and/or latch strikers configured to engage and secure one or more of the front door 1002 and/or rear door 1010 in a closed position. For example, the vehicle may have one or more latches and latch strikers as previously described above with respect to FIGS. 3-6. In some embodiments, the one or more latch strikers may include a first upper latch striker positioned to latch to an upper portion of the front door 1002, a first lower latch striker positioned to latch to a lower portion of the front door 1002, a second upper latch striker positioned to latch to an upper portion of the rear door 1010 and a second lower latch striker positioned to latch to a lower portion of the rear door 1010.

According to some embodiments, a vehicle having the seal and door structure 1000 may have a front door 1002 having an internal structure (e.g., a support structure) that includes an outer portion 1001 and an inner portion 1003, where the inner portion 1003 is spot-welded to the outer portion 1001. The rear door 1010 may also include a similar internal structure having an inner portion that is spot-welded to an outer portion of an internal structure of the door.

According to some embodiments, a vehicle body of the present disclosure may include a first side (e.g., a driver's side) that does not have a B-pillar, but has a front door 1002 that rotates on one or more front hinges and a rear door 1010 that rotates on one or more rear hinges such that the front door 1002 and rear door 1010 close together in a barn-door fashion. The vehicle body may have a second side (e.g., a passenger's side) that is a mirror image of the first side, having another set of doors without a B-pillar integrated into the vehicle body. Further, when the front door 1002 and the rear door 1010 are both in a closed position, an outer seal 1006 of the front door compresses against a first sealing surface of the rear door 1010 and an inner seal 1016 of the front door 1002 compresses against a second sealing surface of the rear door 1010 to create a water seal between the front door and the rear door. Each of the outer seal 1006 and inner seal 1016 may create its own watertight seal when the doors are closed. When the front door 1002 and rear door 1010 are both in a closed position, a first frame of the front door 1002 is positioned adjacent to a second frame of the rear door 1010 to form a quasi-B-pillar, which provides structural support for the vehicle body when the doors are secured in a closed position. Further, when the front door 1002 and rear door 1010 are both in a closed position, the rear door 1010 is configured to open independently of the front door, for example, in response to a user-initiated door opening action, such as engaging a door handle of the rear door 1010 and pulling the rear door 1010 open. In other words, the front door 1002 can be readily opened and closed regardless of the position of the rear door 1010 (i.e., whether the rear door 1010 is opened or closed) and the rear door 1010 can be readily opened and closed regardless of the position of the front door 1002.

According to some embodiments, a vehicle body of the present disclosure may be without a B-pillar and may include a front door 1002 and rear door 1010 that are configured to close together in a barn-door fashion and the front door 1002 and rear door 1010 are configured to open and close independently of one another. In other words, either the front door 1002 or the rear door 1010 may be opened or closed without regard to the other door. Thus, for example, the rear door 1010 may be opened from a closed position while the front door 1002 is in a closed position without any need to first open the front door 1002. The front door 1002 may include a first seal configured to compress against a first portion of the rear door 1010 and a second seal configured to compress against a second portion of the rear door 1010 when the front door 1002 and rear door 1010 are both in a closed position. Further, the front door 1002 may include a first frame structure (e.g., inner portion 1003 of the front door 1002) and the rear door 1010 may include a second frame structure (e.g., inner portion 1003 of the rear door 1002). When the front door 1002 and rear door 1010 are both in a closed position, the first frame structure and second structure are configured to form a B-pillar structure (e.g., the quasi-B-pillar 120 shown in FIG. 1). According to some embodiments, the B-pillar structure may be made up of one or more of the first structural member 1035, second structural member 1037, and third structural member 1038 of the front door 1002 and the first structural member 1035, second structural member 1037, and third structural member 1038 of the rear door 1010. Further, in some embodiments, the B-pillar structure may further include one or more door latches or latching mechanisms (e.g., latching mechanism 620) being engaged with one or more respective door latch strikers (e.g., upper door latch strikers 302, 304 and/or lower door latch strikers 312, 314) to secure the front and rear door 1002, 1010 closed and allow transfer of loads via the structural members and latches. According to some embodiments, the B-pillar structure is formed upon securely latching the front and rear doors 1002, 1010 to the body of the vehicle.

While the present disclosure has described various novel features of a vehicle, it will be understood that the description provided herein is not intended to be limited to a single embodiment. For example, one embodiment may include a vehicle having the window seal system 200 described with respect to FIGS. 2A-2D. Another embodiment may include a vehicle having the seal and door structure 1000 described with respect to FIGS. 10A-10D. Another embodiment may include a vehicle having both the window seal system 200 and the seal and door structure 1000. These example embodiments are not intended to be limiting and it is contemplated that various embodiments may incorporate any combinations of the various features described throughout this disclosure.

In some examples, disclosed systems or methods may involve one or more of the following clauses:

Clause 1: A system comprising: a vehicle door comprising: a door body comprising a framing portion; and a window configured to be vertically repositioned to open and close the window, the window comprising a frameless portion and a framed portion, wherein the framed portion of the window corresponds to the framing portion of the door body; and a vehicle body comprising: a primary seal configured to compress against an internal face of the framed portion and frameless portion of the window to create a watertight seal when the window is in a first closed position and a second closed position; and a secondary seal configured to secure at least the frameless portion of the window in place when the window is in the second closed position.

Clause 2: The system of clause 1, wherein the vehicle body further comprises a lip configured to attach the primary seal to the vehicle body along a portion of the vehicle body that is proximate to the frameless portion of the window when the vehicle door is closed.

Clause 3: The system of clause 2, wherein the primary seal comprises: a first portion that is mounted to the lip of the vehicle body, the first portion being configured to engage at least a portion of the frameless portion of the window; a second portion that is through-hole mounted into the vehicle body, the second portion being configured to engage at least a portion of the framing portion of the door body; and a transitional portion positioned between the first portion and second portion that allows the primary seal to form a continuous barrier.

Clause 4: The system of clause 3, wherein the vehicle body further comprises a door latch striker plate having one or more door latch strikers that are configured to secure the vehicle door to the vehicle body when the vehicle door is closed, the door latch striker plate being positioned proximate the transitional portion of the primary seal when the vehicle door is closed.

Clause 5: The system of clause 1, wherein the primary seal comprises one or more internal compartments.

Clause 6: The system of clause 5, wherein the one or more internal compartments comprise one or more of a delta (Δ) shape, an eight (8) shape or a modified delta (Δ) shape having an S-shape member on one side.

Clause 7: The system of clause 4, wherein the primary seal further comprises a latch striker plate seal that is configured to form a seal around the latch striker plate when the vehicle door is closed.

Clause 8: The system of clause 1, wherein the secondary seal comprises a pillow and a lip, wherein the pillow comprises an internal indentation on a wall of the pillow that is proximate the lip; and in response to the window being placed in the second closed position, the pillow is configured to compress around a top portion of the window and the lip is configured to bend towards the window at least in part at the internal indentation of the pillow and press against an outer portion of the window to secure the window in place.

Clause 9: The system of clause 8, wherein one or more of the primary seal and the secondary seal are configured to form a continuous seal around a door ring housing the vehicle door.

Clause 10: The system of clause 1 wherein: the window further comprises an insert attached to a first edge of the window, the framing portion of the door body further comprises a window guide configured to receive the insert, the window guide being positioned within an internal structure of the framing portion of the door body, the internal structure comprising a seal positioned behind the window to form a channel between a second edge of the window and an edge of an exterior trim piece directing fluid externally away from the door body.

Clause 11: A system comprising: a vehicle door comprising a window; a vehicle body comprising a recess for receiving a portion of the window, the recess comprising a first seal and a second seal; one or more processors; and a memory in communication with the one or more processors and storing instructions that, when executed by the one or more processors, are configured to cause the system to: in response to determining that the vehicle body has exceeded a predetermined speed threshold, automatically cause the window to move from a first closed position to a second closed position.

Clause 12: The system of clause 11, wherein: when the window is in the first closed position, the first seal compresses against the window to form a watertight barrier and positions the window such that an outer surface of the window is substantially flush with an outer surface of the vehicle body; and when the window is in the second closed position with the window positioned higher than in the first closed position, a pillow of the second seal is configured to compress around a portion of the window and a lip of the second seal is configured to secure an outer surface of the window.

Clause 13: The system of clause 12, wherein the first seal comprises one or more compartments comprising one or more of a delta (Δ) shape, an eight (8) shape or a modified delta (Δ) shape having an S-shape member on one side.

Clause 14: The system of clause 10, wherein a first portion of the first seal is mounted to a flange of the vehicle body and is configured to receive a frameless portion of the vehicle door, a second portion of the first seal is clipped into the vehicle body, and a transitional portion of the first seal is positioned between the first portion of the first seal and the second portion of the first seal such that the first seal forms a continuous barrier.

Clause 15: The system of clause 14, wherein the first seal further comprises a latch striker plate seal that is formed around a latch striker plate of the vehicle.

Clause 16: The system of clause 11, wherein automatically causing the window to move from the first closed position to the second closed position comprises transmitting instructions, by the one or more processors, to one or more window motors to raise a window position from a first height at the first closed position to a second height at the second closed position, the second height being higher than the first height.

Clause 17: The system of clause 11, wherein the one or more processors are further configured to cause the system to: in response to determining that a speed of the vehicle body has dropped from being above the predetermined speed threshold to being below the predetermined speed threshold, automatically cause the window to move from the second closed position to the first closed position.

Clause 18: A method comprising: receiving vehicle input data of a vehicle, the vehicle input data comprising at least vehicle speed; determining whether the vehicle speed is greater than a predetermined value; and responsive to determining the vehicle speed is greater than the predetermined value, transmitting instructions to one or more window motors to cause the one or more window motors to raise a window position of a window from a first closed position to a second closed position.

Clause 19: The method of clause 18, wherein when the window is in the first closed position, a first seal of a vehicle body of the vehicle forms a watertight barrier between the vehicle body and the window and when the window is in the second closed position, a second seal of the vehicle body compresses around a top portion of the window to secure the window in place.

Clause 20: The method of clause 18 further comprising: responsive to determining the vehicle speed has been reduced from being greater than the predetermined value to being less than or equal to the predetermined value, transmit instructions to the one or more window motors to lower the window position of the window from the second closed position to the first closed position.

Clause 21: A vehicle comprising: a front door comprising a first seal and a second seal, the front door hinged at the front of the vehicle; and a rear door comprising a first sealing surface configured to receive the first seal and a second sealing surface configured to receive the second seal, the rear door hinged at the rear of the vehicle; wherein the front door and the rear door are capable of independently opening and closing.

Clause 22: The vehicle of clause 21, wherein the front door comprises: a first vehicle interior-facing face; a first vehicle exterior-facing face; and a rear door-facing face, wherein first seal and the second seal are positioned on the rear door-facing face of the front door.

Clause 23: The vehicle of clause 22, wherein the rear door comprises: a second vehicle interior-facing face; a second vehicle exterior-facing face; and a front door-facing face, wherein first sealing surface and the second sealing surface are disposed on the front door-facing face of the rear door.

Clause 24: The vehicle of clause 23, wherein the first seal extends outwards from the rear door-racing face of the front door such that a first portion of the first seal compresses against the first sealing surface of the rear door when the front door and rear door are in a closed position.

Clause 25: The vehicle of clause 24, wherein the second seal extends outwards from the rear door-facing face of the front door such that a first portion of the second seal compresses against the second sealing surface of the rear door when the front door and rear door are in a closed position.

Clause 26: The vehicle of clause 25, wherein the first seal comprises a rubber material comprising a rounded cross-sectional shape having one or more hollow cavities that are configured to allow the first seal to compress when pressed against the first sealing surface of the rear door.

Clause 27: The vehicle of clause 26, wherein the second seal comprises a rubber material comprising a rounded cross-sectional shape and comprising one or more hollow cavities that are configured to allow the second seal to compress when pressed against the second sealing surface of the rear door.

Clause 28: The vehicle of clause 27, wherein the first seal is positioned at a first portion of the rear door-facing face of the front door that is proximate to the first vehicle interior-facing face of the front door and the second seal is positioned at a second portion of the rear door-facing face of the front door that is proximate to the first vehicle exterior-facing face of the front door.

Clause 29: The vehicle of clause 21, wherein the first seal and the second seal each comprise a shape and material that: exert sufficient outward pressure to create a watertight seal between the front door and rear door when the front door and rear door are in a closed position; and provide sufficient flexibility to allow each of the front door and the rear door to be opened independently of one another.

Clause 30: The vehicle of clause 21, further comprising a soft-close door system that is configured to provide a mechanical assist in initially opening one or more of the front door or the rear door and completing the closing of the one or more of the front door or the rear door, and an anti-pinch switch positioned on an internal surface of an exterior trim piece, the anti-pinch switch being proximate the external surface of one of the front door or rear door.

Clause 31: The vehicle of clause 21, wherein: the front door comprises a first frame structure proximate the rear door-facing face of the front door, the first frame structure extending from a bottom of the front door to a top of the front door; the rear door comprises a second frame structure proximate the front door-facing face of the rear door, the second frame structure extending from a bottom of the rear door to a top of the rear door; and when the front door and rear door are both in a closed position, the first frame structure and second frame structure form a quasi-B-pillar.

Clause 32: The vehicle of clause 21, wherein the vehicle further comprises one or more latching mechanisms configured to engage one or more latch strikers of the vehicle and secure one or more of the front door and the rear door in a closed position.

Clause 33: The vehicle of clause 32, wherein the one or more latch strikers comprise a first upper latch striker positioned to latch to an upper portion of the front door, a first lower latch striker positioned to latch to a lower portion of the front door, a second upper latch striker positioned to latch to an upper portion of the rear door and a second lower latch striker positioned to latch to a lower portion of the rear door.

Clause 34: A vehicle body comprising a first side comprising a front door that rotates on one or more front hinges and a rear door that rotates on one or more rear hinges such that the front door and rear door close together in a barn-door fashion, wherein the first side does not have a B-pillar.

Clause 35: The vehicle body of clause 34, wherein when the front door and the rear door are both in a closed position, an outer seal of the front door compresses against a first receiving sealing surface the rear door and an inner seal of the front door compresses against a second sealing surface of the rear door to create a watertight seal between the front door and the rear door.

Clause 36: The vehicle body of clause 34, wherein when the front door and the rear door are both in a closed position, a first frame of the front door is positioned adjacent to a second frame of the rear door to form a quasi-B-pillar.

Clause 37: The vehicle body of clause 34, wherein when the front door and the rear door are both in a closed position, the rear door is configured to open independently of the front door in response to a user-initiated door opening action.

Clause 38: A vehicle body without a B-pillar, the vehicle body comprising a front door and a rear door configured to close together in a barn-door fashion, wherein the front door and rear door are configured to open and close independently of one another.

Clause 39: The vehicle body of clause 38, wherein the front door comprises a first seal configured to compress against a first portion of the rear door and a second seal configured to compress against a second portion of the rear door when the front door and rear door are both in a closed position.

Clause 40: The vehicle body of clause 38, wherein the front door comprises a first frame structure, the rear door comprises a second frame structure, and when the front door and rear door are both in a closed position the first frame structure and the second frame structure are configured to form a B-pillar structure.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions.

Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle comprising:
   a front door comprising a first seal and a second seal, the front door hinged at the front of the vehicle;
   a rear door comprising a first sealing surface configured to receive the first seal and a second sealing surface configured to receive the second seal, the rear door hinged at the rear of the vehicle;
   a soft-close door system that is configured to provide a mechanical assist in initially opening one or more of the front door or the rear door and completing the closing of the one or more of the front door or the rear door; and
   an anti-pinch switch positioned on an internal surface of an exterior trim piece, the anti-pinch switch being positioned proximate the external surface of one of the front door or rear door,
   wherein the front door and the rear door are capable of independently opening and closing.

2. The vehicle of claim 1, wherein the front door comprises:
   a first vehicle interior-facing face;
   a first vehicle exterior-facing face; and
   a rear door-facing face,
   wherein the first seal and the second seal are positioned on the rear door-facing face of the front door.

3. The vehicle of claim 2, wherein the rear door comprises:
   a second vehicle interior-facing face;
   a second vehicle exterior-facing face; and
   a front door-facing face,
   wherein the first sealing surface and the second sealing surface are disposed on the front door-facing face of the rear door.

4. The vehicle of claim 3, wherein the first seal extends outwards from the rear door-facing face of the front door such that a first portion of the first seal compresses against the first sealing surface of the rear door when the front door and rear door are in a closed position.

5. The vehicle of claim 4, wherein the second seal extends outwards from the rear door-facing face of the front door such that a first portion of the second seal compresses against the second sealing surface of the rear door when the front door and rear door are in a closed position.

6. The vehicle of claim 5, wherein the first seal comprises a rubber material comprising a rounded cross-sectional shape having one or more hollow cavities that are configured to allow the first seal to compress when pressed against the first sealing surface of the rear door.

7. The vehicle of claim 6, wherein the second seal comprises a rubber material comprising a rounded cross-sectional shape and comprising one or more hollow cavities that are configured to allow the second seal to compress when pressed against the second sealing surface of the rear door.

8. The vehicle of claim 7, wherein the first seal is positioned at a first portion of the rear door-facing face of the front door that is proximate to the first vehicle interior-facing face of the front door and the second seal is positioned at a second portion of the rear door-facing face of the front door that is proximate to the first vehicle exterior-facing face of the front door.

9. The vehicle of claim 1, wherein the first seal and the second seal each comprise a shape and material that:
   exert sufficient outward pressure to create a watertight seal between the front door and rear door when the front door and rear door are in a closed position; and
   provide sufficient flexibility to allow each of the front door and the rear door to be opened independently of one another.

10. The vehicle of claim 1, wherein:
    the front door comprises a first frame structure proximate the front door's rear door-facing face, the first frame structure extending from a bottom of the front door to a top of the front door;
    the rear door comprises a second frame structure proximate the rear door's front door-facing face, the second frame structure extending from a bottom of the rear door to a top of the rear door; and
    when the front door and rear door are both in a closed position, the first frame structure and second frame structure form a quasi-B-pillar.

11. The vehicle of claim 1, wherein the vehicle further comprises one or more latching mechanisms configured to engage one or more latch strikers of the vehicle and secure one or more of the front door and the rear door in a closed position.

12. The vehicle of claim 11, wherein the one or more latch strikers comprise a first upper latch striker positioned to latch to an upper portion of the front door, a first lower latch striker positioned to latch to a lower portion of the front door, a second upper latch striker positioned to latch to an upper portion of the rear door and a second lower latch striker positioned to latch to a lower portion of the rear door.

* * * * *